US006671258B1

(12) United States Patent
Bonneau

(10) Patent No.: US 6,671,258 B1
(45) Date of Patent: Dec. 30, 2003

(54) DYNAMIC BUFFERING SYSTEM HAVING INTEGRATED RANDOM EARLY DETECTION

(75) Inventor: Marie-Claude Bonneau, Gatineau (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/495,378

(22) Filed: Feb. 1, 2000

(51) Int. Cl.[7] ............................................. H04L 312/56
(52) U.S. Cl. ..................................... 370/235; 370/235.1
(58) Field of Search ................................. 370/229, 230, 370/230.1, 231, 232, 235, 235.1, 237, 412

(56) References Cited

U.S. PATENT DOCUMENTS 6,333,917 B1 * 12/2001 Lyon et al. .................. 370/236
6,538,989 B1 * 3/2003 Carter et al. ................ 370/229

OTHER PUBLICATIONS

Xiao, Xipeng et al., "Internet QoS: A Big Picture", Department of Computer Science, Michigan State University, U.S.A., Sep. 9, 1999, pp. 1–25.
Xiao, Xipeng et al., "An Overview of IP Switching and Tag Switching", Department of Computer Science, Michigan State University, U.S.A., pp. 1–7, (undated).

(List continued on next page.)

Primary Examiner—Kenneth Vanderpuye
(74) Attorney, Agent, or Firm—Blake, Cassels & Graydon LLP

(57) ABSTRACT

The method of buffering packets in a digital communications device includes defining an n-level hierarchy of memory partitions, wherein each non-top level partition has one or more child partitions at an immediately lower level of the hierarchy. The memory partitions at the top-most level are pre-configured with a target memory occupancy size, and the target occupancy for each memory partition situated at a lower level is recursively computed in a dynamic manner based on the aggregate congestion of its parent partition, until the target occupancies for the bottom-most memory partitions are determined. Each traffic flow which uses the buffer is associated with one of the memory partitions at the bottom-most level of the hierarchy and packet discard is enabled in the event the actual memory occupancy of a traffic flow exceeds its target occupancy. The memory partitions at higher levels are preferably associated with a set of traffic flows, such as traffic flows associated with a particular egress port and class of service, to thereby selectively control aggregate congestion. Traffic flow sets may be also be defined in respect of adaptive flows such as TCP flows which decrease their transmission rates in response to congestion notification, and non-adaptive flows such as UDP flows which do not decrease their transmission rates. Random early detection (RED) is applied to such traffic flows based on the target occupancy of the corresponding memory partition. The method is expected to improve network performance, allow full buffer sharing, permit the weighted distribution of buffer space within a memory partition, and scale easily to large systems.

18 Claims, 13 Drawing Sheets

OTHER PUBLICATIONS

Floyd, Sally et al., "Random Early Detection Gateways for Congestion Avoidance", Lawrence Berkeley Laboratory, University of California, U.S.A., Aug. 1993, IEEE/ACM Transactions on Networking, pp. 1–24 plus 8 pages of Appendix.

Lin, Dong et al., "Dynamics of Random Early Detection", Division of Engineering and Applied Sciences, Harvard University, Massachusettes, U.S.A., Proceedings of SIGCOMM'97, 11 pages.

Choudhury, Abhijit K. et al., "Dynamic Queue Length Threshold in a Shared Memory ATM Switch", Proceedings of I.E.E.E. Infocom 96, Mar. 1996, pp. 679–686.

Guérin, R. et al., "Scalable QoS Provision Through Buffer Management", IBM, T.J. Watson Research Center, Yorktown Heights, New York, U.S.A., 12 pages, (undated).

Clark, David D. et al., "Explicit Allocation of Best–Effort Packet Delivery Service", IEEE/ACM Transactions on Networking, vol. 6, No. 4, Aug. 1998.

Elloumi, Omar et al., "RED Algorithm in ATM Networks", IEEE ATM '97 Workshop Proceedings, May 1997, pp. 312–319.

\* cited by examiner

DYNAMIC BUFFERING SYSTEM HAVING INTEGRATED RANDOM EARLY DETECTION

FIELD OF THE INVENTION

The invention generally relates to a method and system for buffering data packets at a queuing point in a digital communications device such as a network node. More particularly the invention relates to a system for achieving a fair distribution of buffer space between adaptive flows of traffic, the sources of which decrease their transmission rate in response to congestion notification, and non-adaptive flows of traffic, the sources of which do not alter their transmission rate in response to congestion notification.

BACKGROUND OF THE INVENTION

In order to effect statistical multiplexing in a store and forward digital communications device, such devices will typically queue data packets for subsequent processing or transmission in a common storage resource such as a memory buffer. At such a gateway or queuing point, the common storage resource may be shared by traffic flows associated with various classes of service, interface ports, or some other common attributes which define an aggregation of the most granular traffic flows. With traffic of such a multi-faceted nature, sophisticated communication devices need some type of congestion control system in order to ensure that the common storage resource is "fairly" allocated amongst the various traffic flows.

INTERNET ROUTERS

For example, in an Internet router, the transport level protocol may be some form of TCP (Transmission Control Protocol) or UDP (User Datagram Protocol). The datagrams or packets of such protocols are somewhat different and hence may be used to define different traffic flows. Within each of these protocols the packets may be associated with one of several possible classes or qualities of service which may further define the traffic flows at a hierarchically lower level of aggregation or higher level of granularity. (A number quality of service schemes for the Internet are currently being proposed by various standard-setting bodies and other organizations, including the Integrated Service/ RSVP model, the Differentiated Services (DS) model, and Multi-Protocol Label Switching (MPLS), and the reader is referred to Xiao and Lee, *Internet QoS: A Big Picture*, Department of Computer Science, Michigan State University, <http://www.cse.msu.edu/~xiaoxipe/researchLink.html>, Sep. 9, 1999, for an overview of these schemes.) Still more granular traffic flows may be defined by packets which share some common attributes such as originating from a particular source and/or addressed to a particular destination, including at the most granular levels packets associated with a particular application transmitted between two end-users.

In an IP router the memory buffer at any given gateway or queuing point may be organized into a plural number of queues which may, for example, hold packets in aggregate for one of the classes of service. Alternatively, each queue may be dedicated to a more granular traffic flow. Regardless of the queuing structure, when the memory buffer becomes congested, it is often desirable to apportion its use amongst traffic flows in order to ensure the fair distribution of the buffer space. The distribution may be desired to be effected at one or more different levels of aggregation, such as memory partitionment between interface ports, and between classes of service associated with any given interface port.

One typically implemented buffer management scheme designed to minimize buffer congestion of TCP/IP flows is the Random Early Detection (RED) algorithm. Under RED, packets are randomly dropped in order to cause different traffic flow sources to reduce their transmission rates at different times. This prevents buffers from overflowing and causing packets to be dropped simultaneously from multiple sources. Such behaviour, if unchecked, leads to multiple TCP sources simultaneously lowering and then increasing their transmission rates, which can cause serious oscillations in the utilization of the network and significantly impede its performance. RED also avoids a bias against bursty traffic since, during congestion, the probability of dropping a packet for a particular flow is roughly proportional to that flow's share of the bandwidth. For further details concerning RED, see Floyd and Jacobson, *Random Early Detection Gateways for Congestion Avoidance*, 1993 IEEE/ACM Transactions on Networking.

However, it has been shown that RED does not always fairly allocate buffer space or bandwidth amongst traffic flows. This is caused by the fact that at any given time RED imposes the same loss rate on all flows, regardless of their bandwidths. Thus, RED may accidentally drop packets from the same connection, causing temporary non-uniform dropping among identical flows. In addition, RED does not fairly allocate bandwidth when a mixture of non-adaptive and adaptive flows such as UDP and TCP flows share link resources. TCP is an adaptive flow because the packet transmission rate for any given flow depends on its congestion window size which in turn varies markedly with packet loss (as identified by non-receipt of a corresponding acknowledgement within a predetermined time-out period). UDP flows are non-adaptive because their packet transmission rates are independent of loss rate. Thus, unless UDP sources are controlled through a fair discard mechanism, they compete unfairly with TCP sources for buffer space and bandwidth. See more particularly Lin and Morris, *Dynamics of Random Early Detection*, Proceedings of SIGCOMM'97.

A variant of the RED algorithm that has been proposed to overcome these problems is the Flow Random Early Drop (FRED) algorithm introduced by Lin and Morris, supra. However, one drawback of FRED is the large number of state variables that needs to be maintained for providing isolation between adaptive and non-adaptive flows. This can prove problematic for high capacity, high speed, routers, and better solutions are sought.

ATM Switch

In an asynchronous transfer mode (ATM) communication system, the most granular traffic flow (from the ATM perspective) is a virtual connection (VC) which may belong to one of a number of different types of quality of service categories. The ATM Forum Traffic Management working group has defined five (5) traffic classes or service categories, which are distinguished by the parameter sets which describe source behaviour and quality of service (QoS) guarantees. These categories include constant bit rate (CBR), real time variable bit rate (rtVBR), non-real time variable bit rate (nrtVBR), available bit rate (ABR), and unspecified bit rate (UBR) service categories. The ABR and UBR service categories are intended to carry data traffic which has no specific cell loss or delay guarantees. UBR service does not specify traffic related guarantees while ABR service attempts to provide a minimum useable bandwidth, designated as a minimum cell rate (MCR). The ATM Forum Traffic Management working group and International Telecommunications Union (ITU) have also proposed a new service category, referred to as guaranteed frame rate (GFR). GFR is intended to provide service similar to UBR but with a guaranteed minimum useable bandwidth at the frame or AAL packet level, which is mapped to the cell level by an MCR guarantee.

In an ATM device such as a network switch the memory buffer at any given queuing point may be organized into a plural number of queues which may hold data packets in aggregate for VCs associated with one of the service categories. Alternatively, each queue may be dedicated to a particular VC. Regardless of the queuing structure, each VC can be considered as a traffic flow and groups of VCs, spanning one or more queues, can also be considered as a traffic flow defined at a hierarchically higher level of aggregation or lower level of granularity. For instance, a group of VCs associated with a particular service class or input/output port may define a traffic flow. When the memory buffer becomes congested, it may be desirable to apportion its use amongst service categories, and amongst various traffic flows thereof at various levels of granularity. For instance, in a network where GFR and ABR connections are contending for buffer space, it may be desired to achieve a fair distribution of the memory buffer between these service categories and between the individual VCs thereof.

The problem of providing fair allocation of buffer space to adaptive and non-adaptive flows also exists in ATM systems. With the introduction of IP over ATM, VCs may carry one or more IP flows, where each IP flow can be adaptive or non-adaptive. Thus, some VCs may be adaptive in nature, others may be non-adaptive in nature, while still others may be mixed. A fair allocation of buffer space between such VCs is desired.

A number of prior art fair buffer allocation (FBA) schemes configured for ATM systems are known. One such scheme is to selectively discard packets based on policing. For an example of this scheme in an ATM environment, a packet (or more particularly, "cell" as a data packet is commonly referred to at the ATM layer) is tagged (i.e., its CLP field is set to 1) if the corresponding connection exceeds its MCR, and when congestion occurs, discard priority is given to packets having a cell loss priority (CLP) field set to zero over packets having a CLP field set to one. See ATM Forum Technical Committee, (Traffic Management working group living list)", ATM Forum, btd-tm-01.02, July 1998. This scheme, however, fails to fairly distribute unused buffer space between connections.

Another known scheme is based on multiple buffer fill level thresholds where a shared buffer is partitioned with these thresholds. In this scheme, packet discard occurs when the queue occupancy crosses one of the thresholds and the connection has exceeded its fair share of the buffer. The fair buffer share of a connection is calculated based on the MCR value of the connection and the sum of the MCRs of all active connections utilizing the shared buffer. However, this technique does not provide an MCR proportional share of the buffer because idle (i.e., allocated but not used) buffer, which can be defined as $$\sum_{i=1}^{N} \max\left(0, \frac{MCR_i}{\sum\limits_{active} MCR} Q_s - Q_i\right),$$

where $Q_s$ is the buffer fill level, $Q_i$ is the buffer segment count for a connection i, and $$\frac{MCR_i}{\sum\limits_{active} MCR} Q_s$$

is the fair share of buffer allocated to the connection, is distributed at random between the connections.

Another scheme for fairly allocating buffer space through selective discard is based on dynamic per-VC thresholds. See Choudhury, A. K., and Hahne, E. L., "Dynamic Queue Length Threshold in a Shared Memory ATM Switch", Proceedings of I.E.E.E. Infocom 96, March 1996, pages 679 to 686. In this scheme the threshold associated with each VC is periodically upgraded based on the unused buffer space and the MCR value of a connection. Packet discard occurs when the VC occupancy is greater than the VC threshold. This method reserves buffer space to prevent overflows. The amount of reserved buffer space depends on the number of active connections. When there is only one active connection, the buffer is not fully utilized, i.e., full buffer sharing is not allowed.

In conclusion, some of the above-mentioned prior art does not fairly distribute buffer space or idle buffer space between traffic flows. Other prior art buffer management schemes also do not allow for full buffer sharing. Another drawback with some prior art buffer management schemes is that they do not address the allocation of buffer space to contending traffic flows defined at multiple levels of aggregation/granularity. The invention seeks to overcome or alleviate some or all of these and other prior art limitations.

In what follows, unless the context dictates otherwise, the term "traffic flow" refers to the most-granular flow of packets defined in a buffer management system. Designers may use their discretion to define the most-granular flow. The term "traffic flow set" refers to an aggregation or grouping of the most-granular traffic flows. In the context of the present invention, a traffic flow set may also consist of a single traffic flow. Thus a traffic flow set as understood herein comprises one or more traffic flows.

SUMMARY OF THE INVENTION

Broadly speaking, one aspect of the invention relates to a method of processing packets at a queuing point in a communications device having a shared memory buffer. The method includes receiving and associating packets with one of a plurality of traffic flow sets. These sets are defined so as to logically contain either adaptive traffic flows or non-adaptive traffic flows, but not both. Each traffic flow set is associated with a target memory occupancy size which is dynamically computed in accordance with a pre-determined dynamic fair buffer allocation scheme, such as a preferred recursive fair buffer allocation method described herein. When any one the traffic flow sets is in a congested state, packets associated therewith are discarded. Congestion is preferably deemed to occur when the actual memory occupancy size of a given traffic flow set reaches the target occupancy size thereof. In addition, packets are randomly discarded for at least the traffic flow sets containing adaptive traffic flows, or alternatively all traffic flow sets, prior to the sets becoming congested. The probability of packet discard within a given traffic flow set is related to the target memory occupancy size thereof. This is preferably subject to the constraint that the probability of packet discard for a given traffic flow set is zero if the target memory occupancy size thereof is below a threshold value (indicative of a relatively non-congested buffer), and reaches one when the given traffic flow set is congested.

The foregoing enables a buffering system operating in accordance with the method to obtain the benefits of random early detection or random early discard since sources of traffic are randomly notified of impending congestion, thereby preventing serious oscillations of network utilization. Some of the drawbacks of the prior art are also avoided since the method ensures that no sources, especially non-adaptive traffic flow sources, consume excessive buffer space due to the fluctuating transmission rates of the adaptive traffic flows. This is due to the logical isolation between adaptive and non-adaptive traffic flows and the fair discard policy enforced by the buffer allocation scheme. Furthermore, unlike the prior art the probability of packet discard is not static as in the prior art but rather dynamic in that it is based on the dynamic target occupancy size. This enables the buffer to be utilized to the maximum extent possible under the selected fair buffer allocation scheme.

Potential fair buffer allocation schemes which can be employed by the method include those schemes described in:

Choudhury and Hahne, "Dynamic Queue Length Thresholds in a Shared Memory ATM Switch", ©1996 IEEE, Ref. No. 0743-166X/96; and both of which are incorporated herein by reference.

In various embodiments described herein the method employs a novel fair buffer allocation scheme disclosed in applicant's co-pending patent application, U.S. Ser. No. 09/320,471 filed May 27, 1999, which is also described in detail herein. In this scheme the memory buffer is controlled by defining a hierarchy of memory partitions, including at least a top level and a bottom level, wherein each non-bottom level memory partition consists of one or more child memory partitions. The size of each top-level memory partition is pre-determined, and a nominal partition size for the child partitions of a given non-bottom level memory partition is dynamically computed based on the congestion of the given memory partition. The size of each child memory partition is dynamically computed as a weighted amount of its nominal partition size. These steps are iterated in order to dynamically determine the size of each memory partition at each level of the hierarchy. The memory partitions at the bottom-most level of the hierarchy represent space allocated to the most granular traffic flows defined in the system, and the size of each bottom-level partition represents a memory occupancy threshold for such traffic flows.

The memory partitions are preferably "soft" as opposed to "hard" partitions in that if the memory space occupied by packets associated with a given partition exceeds the size of the partition then incoming packets associated with that partition are not automatically discarded. In the embodiments described herein, each memory partition represents buffer space allocated to a set of traffic flows defined at a particular level of granularity. For instance, a third level memory partition may be provisioned in respect of all packets associated with a particular egress port, and a more granular second level memory partition may be associated with a subset of those packets which belong to a particular class of service. Therefore, the size of a given partition can be viewed as a target memory occupancy size for the set of traffic flows corresponding to the given partition. At the lowest level of the hierarchy, however, the partition size functions as a threshold on the amount of memory that may be occupied by the most granular traffic flow defined in the system. When this threshold is exceeded, packet discard is enabled. In this manner, aggregate congestion at higher levels percolates down through the hierarchy to effect the memory occupancy thresholds of the most granular traffic flows. The net result is a fair distribution of buffer space between traffic flow sets defined at each hierarchical level of aggregation or granularity.

In the illustrative embodiments, one or more of the memory partitions at any given hierarchical level is allocated to adaptive traffic flows and non-adaptive traffic flows. Packets associated with memory partitions at a pre-determined hierarchical level are randomly discarded prior to those partitions becoming congested, with the probability of discard being related to the size thereof.

Another aspect of the invention relates to a method of buffering data packets. The method involves:

(a) defining a hierarchy of traffic flow sets, the hierarchy including at least a top level and a bottom level, wherein each non-bottom level traffic flow set comprises one or more child traffic flow subsets and wherein at one non-bottom hierarchical level each set with a group of traffic flow sets comprises either adaptive flows or non-adaptive flows (but not both);

(b) provisioning a target memory occupancy size for each top-level traffic flow set;

(c) dynamically determining a target memory occupancy size for each traffic flow set having a parent traffic flow set based on a congestion measure of the parent traffic flow set;

(d) measuring the actual amount of memory occupied by the packets associated with each bottom level traffic flow;

(e) enabling the discard of packets associated with a given bottom level traffic flow set in the event the actual memory occupancy size of the corresponding bottom level traffic flow exceeds the target memory occupancy size thereof thereby to relieve congestion; and (f) enabling packets associated with the traffic flow sets containing adaptive flows to be randomly discarded prior to the step of discarding packets for congestion relief.

In the embodiments described herein, the target memory occupancy size for a given traffic flow set is preferably computed by first computing a nominal target occupancy size for the child traffic flow sets of a common parent. The target memory occupancy size for each such child traffic flow set is then adjusted to a weighted amount of the nominal target occupancy size. The nominal target occupancy size for a given group of child traffic flow sets preferably changes in accordance with a pre-specified function in response to the congestion of their common parent traffic flow set. In some of the embodiments described herein, congestion is defined as a disparity between the target and measured memory occupancy sizes of a parent traffic flow set, and geometric and decaying exponential functions are deployed for computing the nominal target occupancy size for the child sets thereof.

The invention may be implemented within the context of an ATM communications system as disclosed herein. In these embodiments, the comparison specified in step (e) is preferably carried out prior to or upon reception of the first cell of an ATM adaptation layer (AAL) frame or packet in order to effect early packet discard in accordance with the outcome of the comparison.

In various embodiments disclosed herein, the bottom-level traffic flow sets are logically isolated so as to encompass either adaptive flows or non-adaptive flows, but not both. Random early discard is applied as discussed in greater detail below to at least the traffic flow sets at a pre-selected hierarchical level which contain adaptive flows, such as VCs which carry TCP/IP traffic. Alternatively, random early discard may be applied to all traffic flow sets at a preselected hierarchical level. This may be desired if, for instance, it is not known a priori which VC will be carrying TCP/IP traffic and which will be carrying UDP traffic. In either case, the probability of discard is preferably related to the target memory occupancy size of the traffic flow sets at the pre-selected hierarchical level.

The buffering system according to this aspect invention scales well to large systems employing many hierarchical levels. This is because there are relatively few state variables associated with each hierarchical level. In addition, most computations may be performed in the background and lookup tables may be used, thereby minimizing processing requirements on time critical packet arrival. This system also enables full buffer sharing, as discussed by way of an example in greater detail below.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements in a grouping of such like elements bear unique alphabetical suffixes).

DETAILED DESCRIPTION OF THE PREFERRED EMBODIMENTS

The detailed description is divided in three parts. First, the discussion focuses on the preferred recursive fair buffer allocation (FBA) system which provides full buffer sharing. A number of examples of this system are presented. Next, the discussion relates to extending the preferred FBA system in order to enable random early discard. Finally, the discussion relates to alternative choices of FBA systems which may be employed by the invention.

1. Recursive Fair Buffer Allocation (FBR) System

Figure 1:
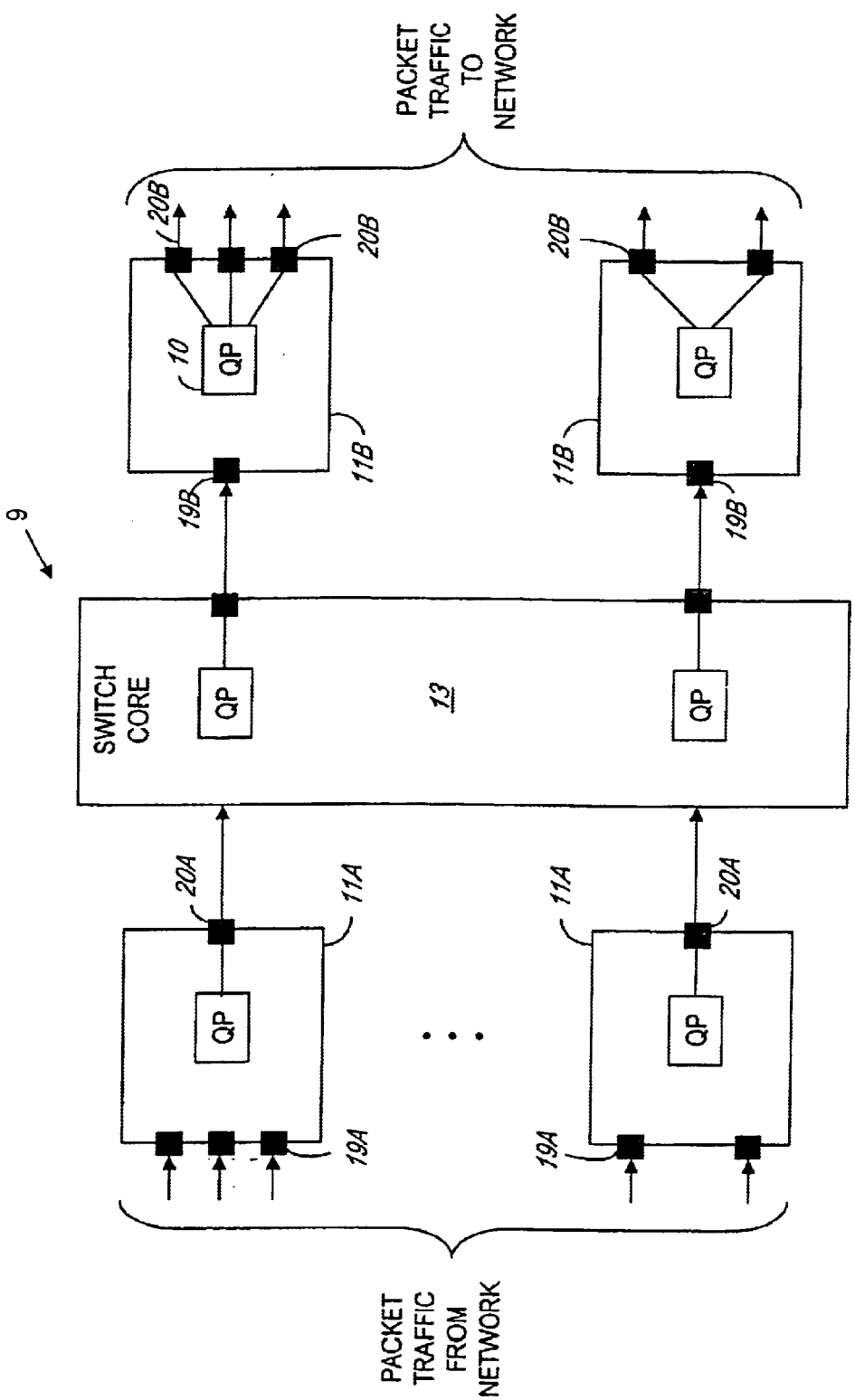
FIG. 1 is a system block diagram of a conventional switch or router architecture illustrating various queuing points therein.

FIG. 1 is a diagram of the architecture of a conventional "Layer 2" switch or "Layer 3" router designated by reference numeral 9 and hereinafter referred to as a "node". The node 9 comprises a plurality of ingress and egress line cards 11A and 11B for interfacing with the network (not shown) via physical interface ports. Ingress line $9a$ cards 11A are configured to receive packet traffic from the network via ingress ports $19a$ and transmit packets to a switching core 13 via egress ports $20a$. The switching core 13, as is known in the art, directs each packet to the appropriate egress line cards 11B. These line cards are configured to receive packet traffic from the switching core 13 via ingress ports $19b$ and transmit packets to the network via egress ports $20b$.

The line cards 11A and 11B as well as the switching core 13 are each "store and forward" devices and hence present a point, QP, within the node 9 wherein packets are queued in a memory or buffer for subsequent processing by the device (hereinafter "queuing point"). At each queuing point a buffer management system is provided as part of the store and forward functionality.

Figure 2:
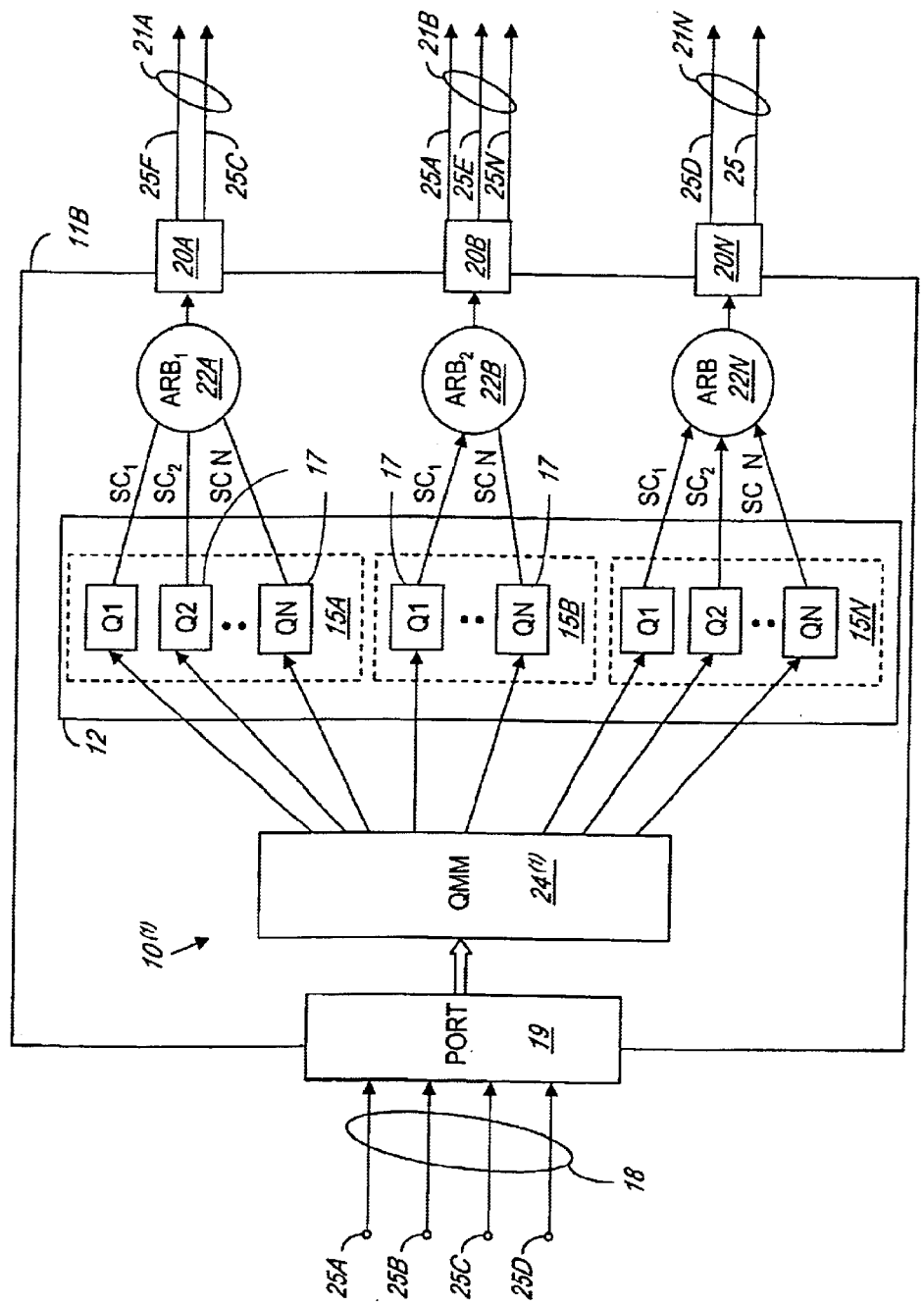
FIG. 2 is a system block diagram of a buffering system according to a first embodiment of the invention employed at one of the queuing points shown in FIG. 1.

FIG. 2 shows an example of a buffer management system $10^{(1)}$ employed in egress line card 11B. The system $10^{(1)}$ comprises a common storage resource such as a physical memory 12, portions of which are allocated, as subsequently discussed, to various logical traffic flows 25 carried by or multiplexed on aggregate input stream 18. A controller such as queue management module (QMM) $24^{(1)}$ organizes and manages the memory 12 according to a selected queuing scheme. In the illustrated embodiment, for example, the QMM $24^{(1)}$ employs an aggregate queuing scheme based on service class and egress port. More specifically, the QMM $24^{(1)}$ organizes the memory 12 into multiple sets 15 of logical queues 17. In each set 15 there preferably exists one queue for each service class of the communication protocol. For instance, when applied to ATM communications, each set 15 may comprise six (6) queues 17 in respect of the CBR, rtVBR, nrtVBR, ABR, UBR, and GFR service classes. Alternatively, the packets associated with two or more service classes may be stored in a common queue in which case there may be less than a 1:1 relationship between queues and service classes. In any event, the number of sets 15 preferably corresponds to the number of egress ports 20 of the line card 11B, with each set of queues holding packets destined for the corresponding egress port.

Accordingly, as the ingress port 19 receives the packets of aggregate input stream 18, the QMM $24^{(1)}$ decides whether to store or discard a given packet based on certain criteria described in greater detail below. If a packet is destined to be stored, the QMM $24^{(1)}$ reserves the appropriate amount of memory, associates each packet with the appropriate logical queue 17, and stores the packet in the memory 12. In the illustrated node, the function of matching an inbound packet to a given logical queue 17 is based in part on header or address information carried by the packet and stored connection configuration information, but it will be understood that other node architectures may employ various other mechanisms to provide this capability. Arbiters 22 each multiplex packets from the logical queues 17 to their corresponding egress ports 20 according to a selected service scheduling scheme such as weighted fair queuing (WFQ). When a queue/packet is serviced by one of the arbiters 22, the corresponding memory block is freed, the QMM $24^{(1)}$ is notified as to which queue was serviced, and the packet is delivered to the corresponding egress port 20 for transmission over an aggregate output stream 21.

Figure 3:
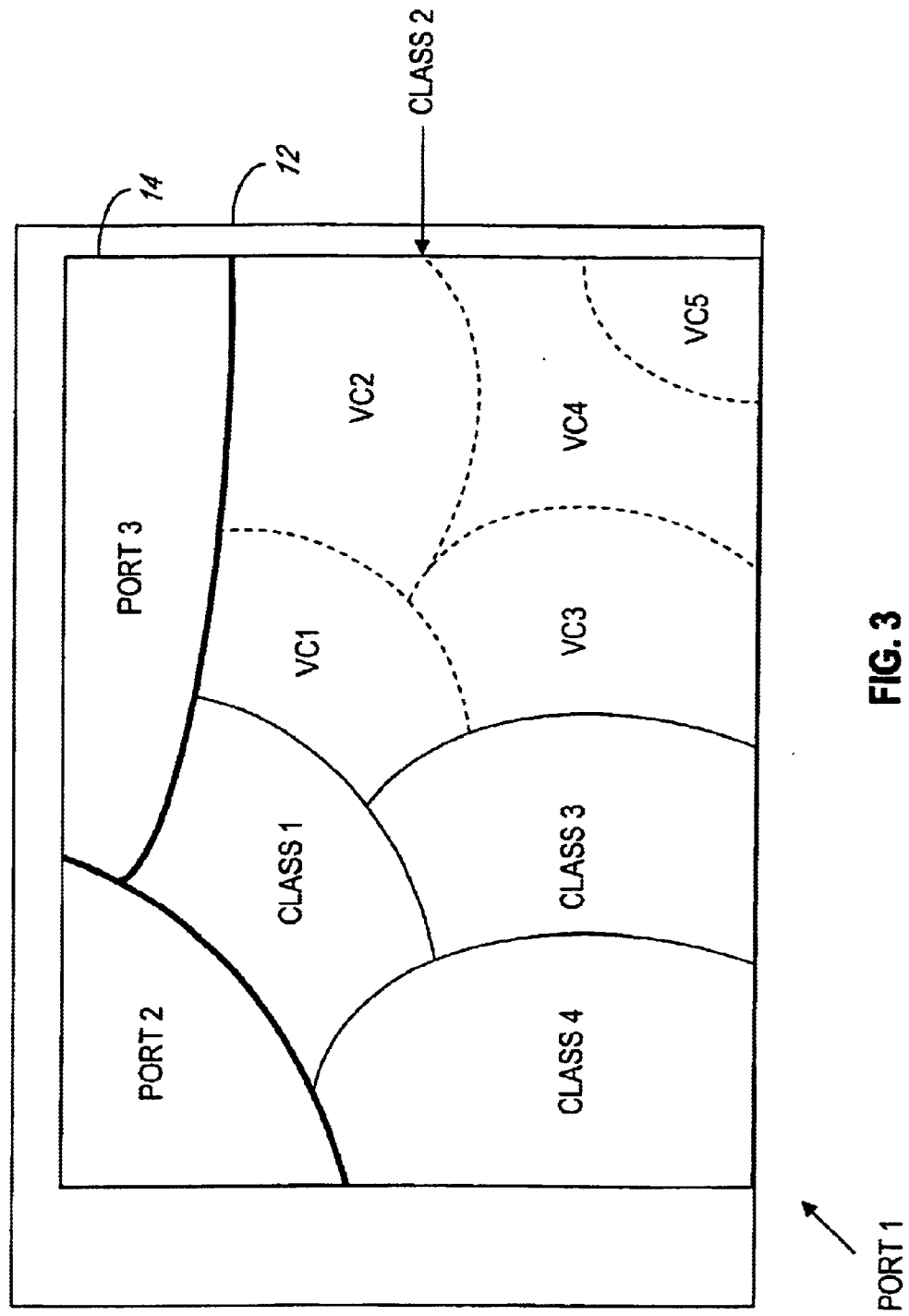
FIG. 3 is a Venn diagram showing how memory is hierarchically partitioned in the first embodiment.
Figure 4:
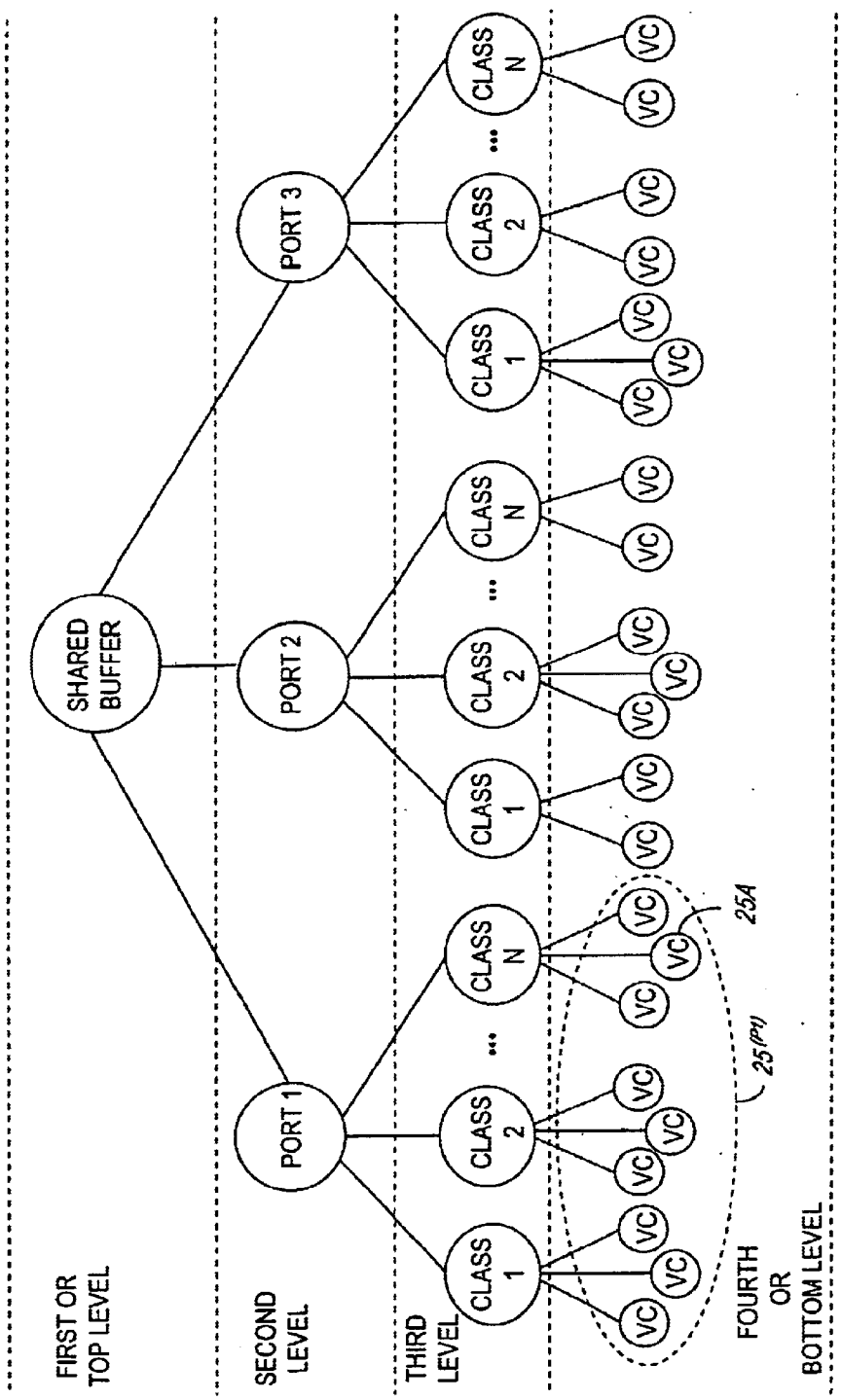
FIG. 4 is a diagram showing the hierarchical partitionment of the memory in the first embodiment in tree form.

The respective Venn and tree diagrams of FIGS. 3 and 4 show how the physical memory 12 may be partitioned in a hierarchical manner in accordance with the queuing scheme described with reference to FIG. 2. In this example, there are four levels in the hierarchical partitionment of memory 12. At a first or top level, the memory is logically partitioned into a shared buffer space $14^{(1)}$ which occupies a subset (less than or equal to) of the amount of fixed physical memory 12. The excess memory space above the shared buffer space represents free unallocated space. At a more granular second level, the memory space allocated to the shared buffer $14^{(1)}$ is partitioned amongst the various egress ports 20b of line card 11B. At a still more granular third level, the memory space allocated to each egress port is further partitioned into service classes. At a fourth or bottom level, the memory space allocated to each service class is further partitioned amongst the most granularly defined traffic flows. In the case of ATM communications, a suitable candidate for these traffic flows may be individual VCs, as shown, such as virtual channel circuits (VCC) and virtual path circuits (VPC), but in other types of communication protocols the most granularly defined traffic flows may be selected by the commonality of various other types of attributes, such as described above with reference to IP routers.

In general, at each level of the hierarchical partitionment of the memory 12 other than at the bottom most level there may exist one or more memory partitions. Each such partition is further subdivided into one or more partitions, individually referred to herein as a "child" partition, located on a preferably, but not necessarily, immediately lower level of the hierarchy. In other words, one or more intermediate levels of the hierarchical partitionment may be absent for any one or more traffic flows represented in memory. At the bottom-most level of the hierarchy the memory partitions are not further subdivided. Similarly, a partition located at the top-most level of the hierarchy will not have a "parent" partition.

Since in the present application each memory partition (e.g., shared buffer, ports, classes, and VCs) represents memory space notionally allocated to a group or set of one or more traffic flows at various levels of granularity, there also exists a corresponding traffic flow hierarchy. For instance, in the embodiment shown in FIGS. 3 and 4, one fourth level traffic flow set consists of an individual VC 25a, and one second level traffic flow set consists of a group of VCs $25^{(P1)}$, including VC 25a, associated with egress port no. 1 (ref. no. 20a in FIG. 2). It will be understood from the present example that a given traffic flow set consists of one or more traffic flow subsets, individually referred to herein as a "child" set, preferably located on an immediately lower level of the hierarchy. The exception to this occurs at the bottom-most level of the hierarchy wherein the traffic flow sets will not have any defined subset. Similarly, a traffic flow set located at the top-most level of the hierarchy will not have a "parent" set.

The memory partitions are "soft" as opposed to "hard" partitions, meaning that if the memory space occupied by packets associated with a given partition exceeds the size of the partition then the QMM $24^{(1)}$ does not automatically discard incoming packets associated with that partition. Rather, the size of a given partition can be viewed as a target memory occupancy size for the traffic flow set corresponding to that partition. At the lowest level of the hierarchy, however, the partition size functions as a threshold on the amount of memory that may be occupied by the corresponding traffic flow. When this threshold is exceeded, the QMM $24^{(1)}$ enables packet discard. In ATM systems, the QMM $24^{(1)}$ may be configured to effect cell discard (i.e., at the ATM layer), or to effect early frame or partial frame discard for frame based traffic (i.e., at the AAL layer). In routers the QMM may be configured to effect complete or partial frame discard.

The size of each partition is generally variable and dynamically determined by the QMM $24^{(1)}$ in order to control the aggregate congestion of the memory 12. More specifically, at each level of the hierarchy, the aggregate congestion within a given parent memory partition is controlled by computing a nominal partition size that can be applied to each of its child partitions (which preferably, although not necessarily, exists at the immediately next lower level of the hierarchy). The value of the nominal partition size for the child partitions of a common parent can be based on a number of factors such as the degree of congestion, its rate of change or even the mere existence or non-existence of congestion within the parent partition. Specific examples are given below. Regardless of the function, this process is recursively carried out throughout the hierarchy in order to dynamically determine the size for each partition at each level of the hierarchy. In this manner, aggregate congestion at higher levels percolate down through the hierarchy to affect the memory occupancy thresholds for the most granularly defined traffic flows.

Figure 5:
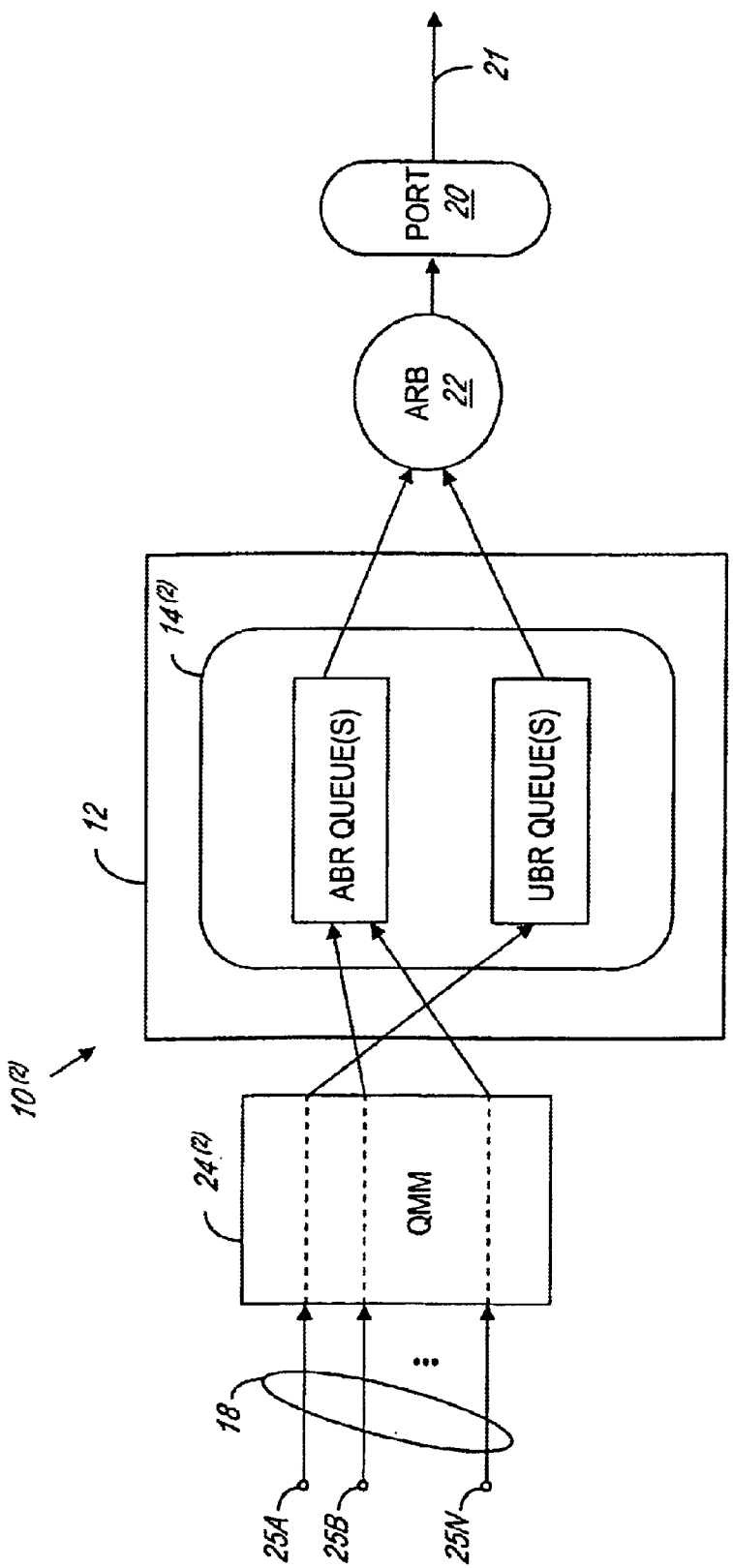
FIG. 5 is a system block diagram of a buffering system according to a second embodiment of the invention.
Figure 6:
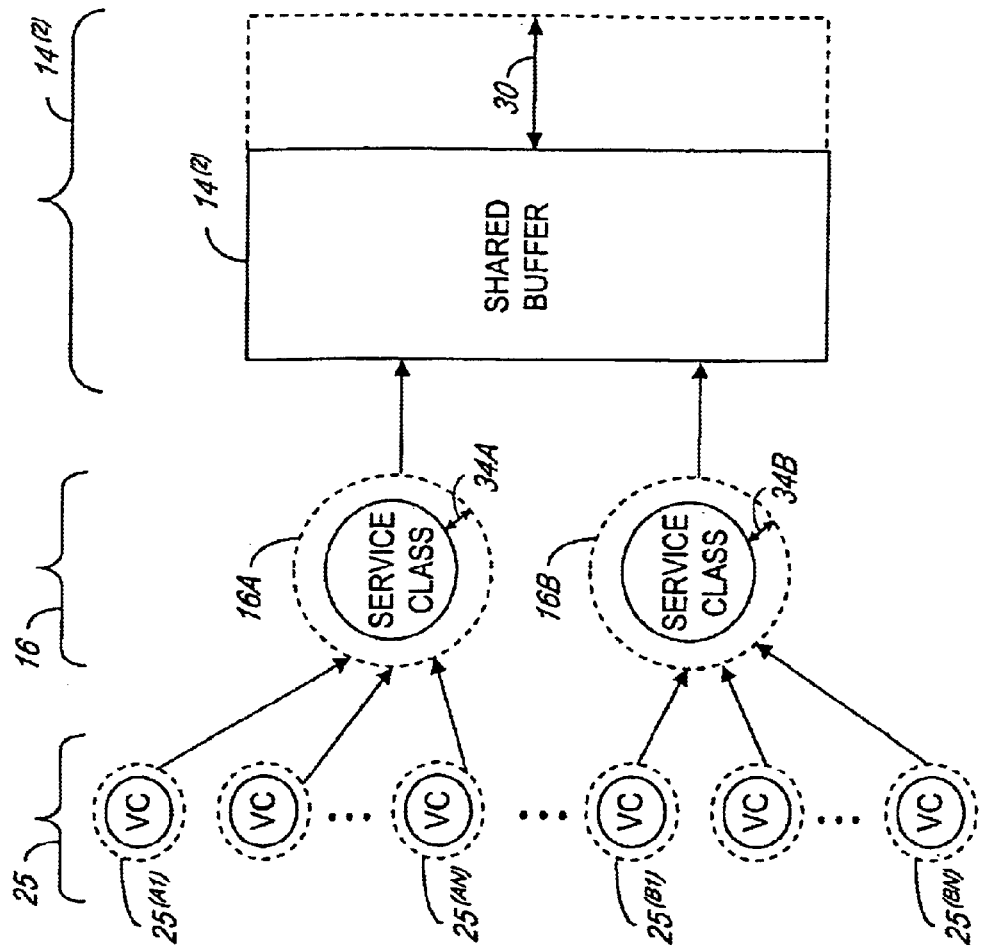
FIG. 6 is a diagram showing, in tree form, how the memory in the second embodiment is hierarchically partitioned.

A second embodiment, implemented in software, is now discussed in order to describe a specific algorithm for computing the partition sizes. Referring additionally to FIGS. 5 and 6, this more simplified embodiment is directed toward a single-port buffering subsystem $10^{(2)}$ wherein the memory 12 is partitioned into a shared memory buffer $14^{(2)}$ provisioned specifically for ATM ABR and UBR traffic. The remaining portion of the memory 12 may be allocated to other ATM service categories, as described previously, or reserved for over-allocation purposes. FIG. 6 shows the hierarchical partitionment of the memory using a tree structure. Since subsystem $10^{(2)}$ features only one egress port, no provision has been made in this hierarchy for partitioning the memory amongst egress ports as in the previously discussed embodiment. Thus the hierarchical partitionment of the memory 12 and the corresponding traffic flow hierarchy features only three levels, namely shared buffer $14^{(2)}$, service classes 16, and VCs 25.

The following pseudo-code demonstrates the algorithm executed by the QMM 24[(2)] of this embodiment.

PSEUDO-CODE

VARIABLE DEFINITION:

Per Buffer

- TBS - A constant which provides a target size for the buffer, in units of cells.
- B_count - Counter for measuring the total number of cells stored in the buffer, thereby reflecting the amount of shared buffer currently being utilized.
- Last_B_count - A variable for holding the measure of the total number of cells stored in the buffer during a previous iteration.
- TSCS - A control variable which is used to set a target size (in terms of the number of cells) for a service class within the buffer. TSCS varies over time based on a disparity between TBS and B_count, as explained in greater detail below.
- FBS - A constant used to provide a lower bound on TSCS.
- D1, D2 D3 and D4 - Constants used to effect a geometric series or progression, as discussed in greater detail below.

Per Service Class

- SC_count [i] - Counter for measuring the number of cells in service class i, thereby reflecting the actual memory occupancy for the service class.
- Last_SC_count [i] - A variable for holding the measure of the total number of cells in service class i during a previous iteration.
- $w_{SC}$ [i] - A constant used to specify a weight for service class i.
- TVCS[i] - A control variable which is used to set a target size for a connection within service class i. TSCS[i] varies over time based on a disparity between TSCS*$w_{SC}$[i] and SC_count[i], as explained in greater detail below.
- TCSmin and TCSmax - Constants used to apply minimum and maximum constraints on the value of TVCS[i].

Per Connection

- VC_count[i][j] - Counter for measuring the number of cells stored for connection j of service class i. (Note that the number of connections associated with each service class may vary and hence j may correspondingly have a different range for each value of i.)
- MCR[i][j] - Constant indicative of the MCR or weight of VC j of service class i.
- VCT [i][j] - Variable for the cell discard threshold for connection j of logical service class i. The cell discard threshold is proportional to the corresponding TVCS[i]; more specifically, VCT [i][j] = TVCS[i]*MCR[i][j].

INITIALIZATION:

(100)     TSCS := TBS*FBS
(102)     TVCS[i] := 1 $\forall$ i, i∈{1..N} where N is the number of service classes.

PERIODICALLY CALCULATE TSCS:

(104)     if ( (B_count > TBS) & (B_count > Last_B_count) )
(106)     TSCS: = TSCS*(1-D1)
(108)     else if (B_count < TBS)
(110)     TSCS: = TSCS/(1-D2)
(112)     end if
(114)     subject to constraint that TBS*FBS ≤ TSCS ≤ TBS
(116)     Last_B_count := B_count

PERIODICALLY CALCULATE TVCS[i] ($\forall$ i):

(118)     if ((SC_count[i] > TSCS*$w_{SC}$[i]) & (SC_count[i] > Last_SC_count[i]))
(120)     TVCS[i]: = TVCS[i]*(1-D3)
(122)     else if (SC_count[i] < TSCS*$w_{SC}$[i])
(124)     TVCS[i]: = TVCS[i]/(1-D4)
(126)     end if
(128)     subject to constraint that TCSmin ≤ TVCS[i] ≤ TCSmax
(130)     Last_SC_Count[i] := SC_count[i]

PSEUDO-CODE

UPON CELL ARRIVAL FOR VC[i][j]:

(132)     VCT [i][j] := TVCS[i] * MCR[i][j]
(134)     if( VC_count[i][j] > VCT [i][j] )
(136)     enable EPD
(138)     end if The algorithm involves dynamically computing a target memory occupancy size, i.e., memory partition size, for each traffic flow set. This is symbolized in FIG. 6 by the solid lines used to represent each entity. The actual amount of memory occupied by each traffic flow set is also measured by the algorithm and is symbolized in FIG. 6 by concentric stippled lines. Note that the actual size of memory occupied by any traffic flow set may be less than or greater than its target size.

The algorithm utilizes current and historical congestion information of a given memory partition/traffic flow set in order to determine the nominal target size for its child sets. Broadly speaking, the algorithm dynamically calculates for each traffic flow set:

(a) a target memory occupancy size, and
(b) a control variable, which represents the nominal target memory occupancy size for the child sets of the present set.

In the algorithm, which is recursive, the target memory occupancy size is calculated at step (a) for the present traffic flow set by multiplying the control variable computed by its parent by a predetermined weight or factor. These weights, provisioned per traffic flow set, enables each child set of a common parent to have a different target occupancy.

The value of the control variable calculated at step (b) depends on the congestion of the present traffic flow set. In the algorithm, congestion is deemed to exist when the actual memory occupancy size exceeds the target memory occupancy size of a given traffic flow set. At each iteration of the algorithm, the value of the control variable is decreased if congestion currently exists and if the traffic flow set previously exhibited congestion. This historical congestion information is preferably based on the last iteration of the algorithm. Conversely, the value of the control variable increases if no congestion exists for the traffic flow set. Thus, in this embodiment, the target occupancy for the child sets of a common parent are based on a disparity between the target and actual memory occupancies of the parent.

Steps (a) and (b) are performed for each traffic flow set at a particular level to calculate the respective target occupancies for the child sets thereof at the next lower level of the hierarchy. Another iteration of these steps is performed at the next lower level, and so on, until target occupancies are calculated for the traffic flows at the bottom-most level of the hierarchy.

For instance, the target occupancy for service classes 16A and 16B is based on a disparity 30 between the target and measured occupancy of shared buffer 14[(2)]. Similarly, the target occupancy for each VC 25[(A1)] to 25[(AN)] is based on a disparity 34A between the target and measured occupancy of service class 16A. When an AAL frame or alternatively ATM cell is received, the algorithm identifies the corresponding VC and determines whether its actual memory occupancy exceeds the target memory occupancy size thereof in which case the frame or cell is subject to discard. In this manner congestion at higher levels of the traffic flow hierarchy percolates through the cascaded hierarchical structure to affect the thresholds of individual connections.

Referring additionally to the pseudo-code, TBS represents the target memory occupancy size for buffer $14^{(2)}$. TBS is a fixed value at the highest level. TSCS represents a nominal target size for all service classes 16, and TSCS*$w_{SC}$[i] represents the target size for a particular service class. The factor $w_{SC}$[i] is the weight applied to a particular service class in order to allow different classes to have various target occupancy sizes. Similarly, TVCS[i] represents a nominal target size for the VCs 25 within a particular service class i, and TVCS[i]*MCR[i][j], which is equal to VCT [i][j], represents the target size, as well as the cell discard threshold, for a particular VC. The factor MCR[i][j] provides MCR proportional distribution of buffer space within a service class. TSCS and the values for each TVCS[i] and VCT [i][j] are periodically computed and thus will generally vary over time.

A variety of counters (B_Count, SC_Count [i], VC_Count [i][j]) are employed to measure the actual memory occupancy size of the various traffic flow sets. These are updated by the QMM $24^{(2)}$ whenever a cell is stored or removed from buffer $14^{(2)}$. (The updating of counters is not explicitly shown in the pseudo-code.)

Lines 100–102 of the pseudo-code initialize TSCS and TVCS[i] ∀ i. TSCS is initialized to a target size of TBS*FBS. FBS is preferably equal to 1/N, where N is the number of service classes 16 within shared buffer $14^{(2)}$. This has the effect of initially apportioning the memory buffer equally amongst each service class. Other initialization values are also possible. TVCS[i] is initialized to 1 for each connection, as a matter of convenience.

Lines 104–116 relate to the periodic calculation of TSCS. Line 104 tests whether the actual occupancy of shared buffer $14^{(2)}$ is greater than its target occupancy and is increasing. If so then at line 106 TSCS is geometrically decreased by a factor of 1−D1, where 0<D1<1, e.g., 0.1. Line 108 tests whether the actual occupancy of shared buffer $14^{(2)}$ is less than its target size. If so then at line 110 TSCS is geometrically increased by a factor of 1/(1−D2), where 0<D2<1 e.g., 0.05. The values of D1 and D2 are preferably selected such that when the target occupancy decreases it does so at a faster rate than when it increases, as exemplified by the respective values of 0.1 and 0.05. Those skilled in this art will appreciate that D1 and D2 control how fast the system responds to changes of state and that some degree of experimentation in the selection of suitable values for D1 and D2 may be required for each particular application in order to find an optimal or critically damped response time therefor.

Line 114 constrains TSCS to prescribed maximum and minimum limits of TBS and TBS*FB respectively. The maximum limit prevents service classes from attaining a target occupancy value beyond the availability of the shared buffer. The minimum limit bounds TSCS to ensure that it does not iterate to values that would cause convergence times to suffer.

Lines 118–130 relate to the periodic calculation of TVCS [i] in relation to service class i. Line 118 tests whether the actual occupancy size of service class i is greater than its target size and is increasing. If so then at line 120 TVCS[i] is geometrically decreased by a factor of 1−D3, where 0<D3<1, e.g., 0.1. Line 122 tests whether the actual size of service class i is less than its target size. If so then at line 124 TVCS[i] is geometrically increased by a factor of 1/(1−D4), where 0<D4<1, e.g., 0.05. The values of D3 and D4 are preferably selected such that when TVCS[i] decreases it does so at a faster rate than when it increases, as exemplified by the respective values of 0.1 and 0.05.

Line 128 constrains TVCS[i] to prescribed maximum and minimum limits to ensure that convergence times are not excessive. TCSmax is preferably equal to TBS/LR, where LR is the line rate of the corresponding output port. This upper bound also ensures that a connection can never receive more than TBS buffer space. TCSmin is preferably equal to TBS/MCRmin, where MCRmin is the minimum MCR of all connections. This provides a conservative lower bound.

In this embodiment the QMM $24^{(2)}$ effects early packet discard (EPD), and thus lines 132–138 are actuated when a start-of-packet (SOP) cell is received by the QMM $24^{(2)}$. (In the AAL5 ATM adaption layer protocol the end of packet (EOP) cell signifies the start of the next packet.) The target memory occupancy size or threshold for VC j of service class i is evaluated at line 132 when a SOP cell is received. The threshold is equal to TVCS[i] multiplied by the MCR of the connection. As mentioned earlier, this provides for MCR proportional distribution of the buffer space allotted to service class i. Line 134 tests whether the number of cells stored for VC j exceeds VCT [i][j], its target occupancy. If so, then EPD is enabled at line 136 and the QMM $24^{(2)}$ subsequently discards all cells associated with the AAL5 frame. Lines 132 to 138 are re-executed upon the arrival of the next SOP cell. In the alternative, the system may effect a partial packet discard (PPD) policy. Alternatively still, line 136 may be modified to effect cell discard per se, with lines 132–138 being executed upon the arrival of each cell.

This embodiment is readily scalable to systems having a large number of service classes and connections since there are relatively few state variables associated with the shared buffer and the service classes. In addition, most computations may be performed in the background, thereby minimizing processing requirements on time critical cell arrival.

This embodiment also allows full buffer sharing. To see why this is so, consider an extreme case where all VCs associated with service class 16B cease transmitting cells. In this case, the shared buffer $14^{(2)}$ begins to rapidly empty, causing the measured buffer size to be significantly smaller than the target buffer size. This causes the target sizes for service classes 16A and 16B to increase up to a level of TBS, the target size of the buffer. In turn, TVCS[i] for all connections rises to an amount which enables the service category occupancy to reach TBS. Consequently, the entire buffer becomes available to all of the transmitting connections of service class 16A and full buffer sharing is achieved. Moreover, it will be noted that each VC $25^{(A1)}$ to $25^{(AN)}$ of service class 16A receives a share of the buffer space allotted to that service class in proportion to the MCR of the connection. Consequently, the instantaneously unused buffer space of service class 16A is distributed in proportion to the MCRs of the connections within the service class.

The method of allocating buffer space has been particularly described with reference to the three level traffic flow hierarchy as shown in FIG. 6. Those skilled in the art will understand that the method can be applied with respect to an n-level traffic flow hierarchy.

Figure 7:
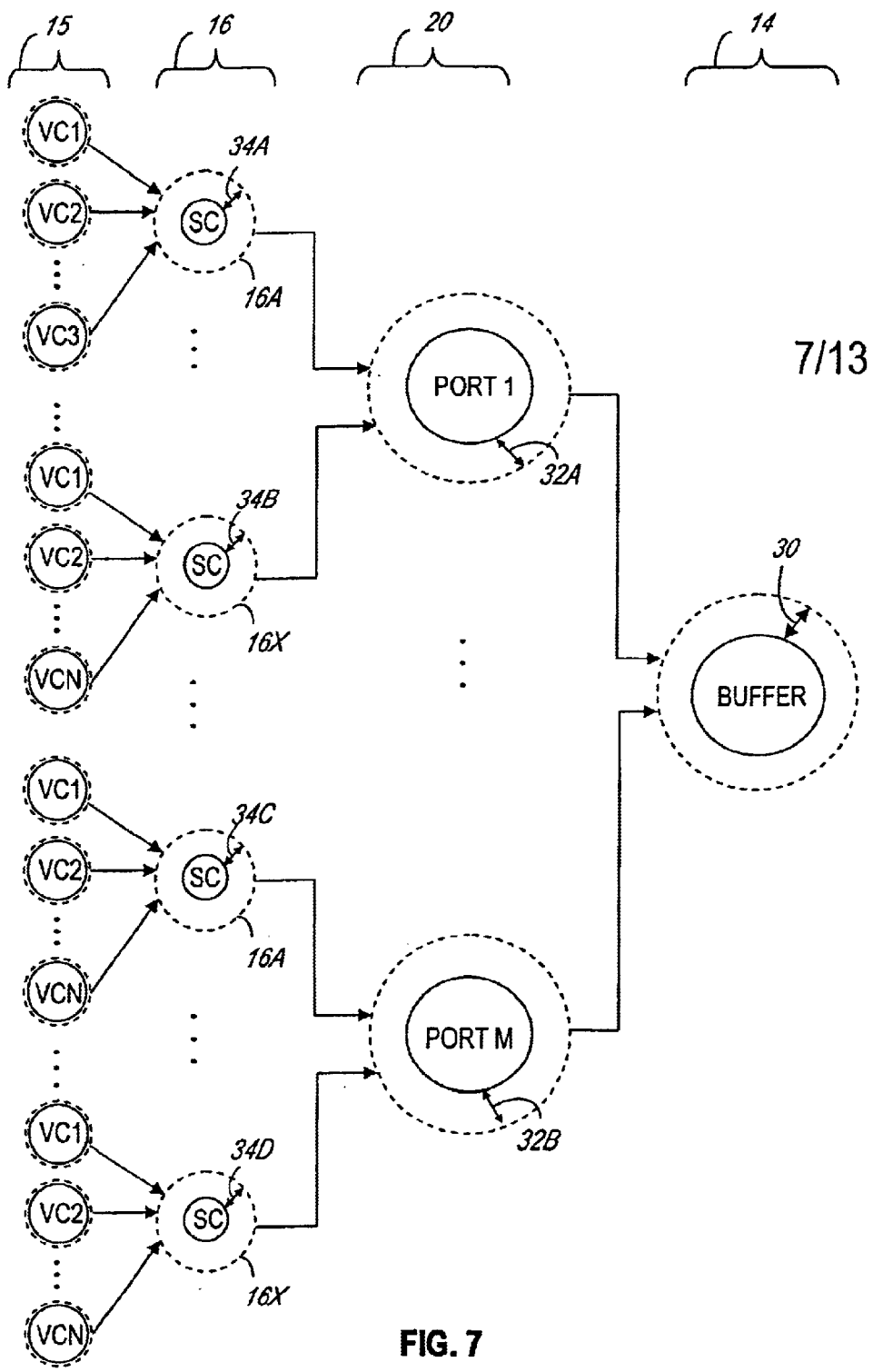
FIG. 7 is a diagram showing, in tree form, an alternative approach to the hierarchical partitionment of the memory in the second embodiment.

For example, FIG. 7 shows a four level hierarchy wherein physical memory 12 is partitioned amongst multiple egress ports 20. The level of the port partitions are disposed between the levels for the shared buffer 14 and service classes 16. In this hierarchy, the target memory occupancy size for each port 20 is based on the disparity 30 between the target and measured memory occupancy sizes of shared buffer 14, and the target sizes for the service classes 16 associated with a given port are based on a disparity 32A or 32B between target and measured memory occupancy sizes of the given port. More specifically, let g{x,y} represent a discrete or iterative function wherein if x>y and x is increasing then g{x,y} geometrically decreases and if x<y then g{x,y} geometrically increases. The nominal target occupancy sizes for the various entities in the hierarchy shown in FIG. 3 can be:

TBS=constant,

TPS=g{B_count, TBS},

TSCS[i]=g{P_count[i], $w_P$[i]*TPS},

TVCS [i, j]=g{SC_count[i, j], $w_{SC}$[i, j]*TSCS[i]}, and

VCT [i, j, k]=TVCS[i, j]*MCR[i, j, k].

In the foregoing, TPS represents a nominal memory occupancy for ports and $w_P$[i] is a weight associated with each port i. The product $w_P$[i]*TPS represents the target size for each particular port, which need not be equal. Similarly, $W_{SC}$[i,j]* TSCS[i] represents the target size for a particular service class j associated with port i.

It should also be noted that g{x,y} may alternatively provide progressions other than geometric, including but not limited to linear, hyperbolic, logarithmic or decaying exponential progressions. Each type of progression will provide different convergence characteristics. Also, g{x,y} need not necessarily consider historical congestion information.

Figure 8:
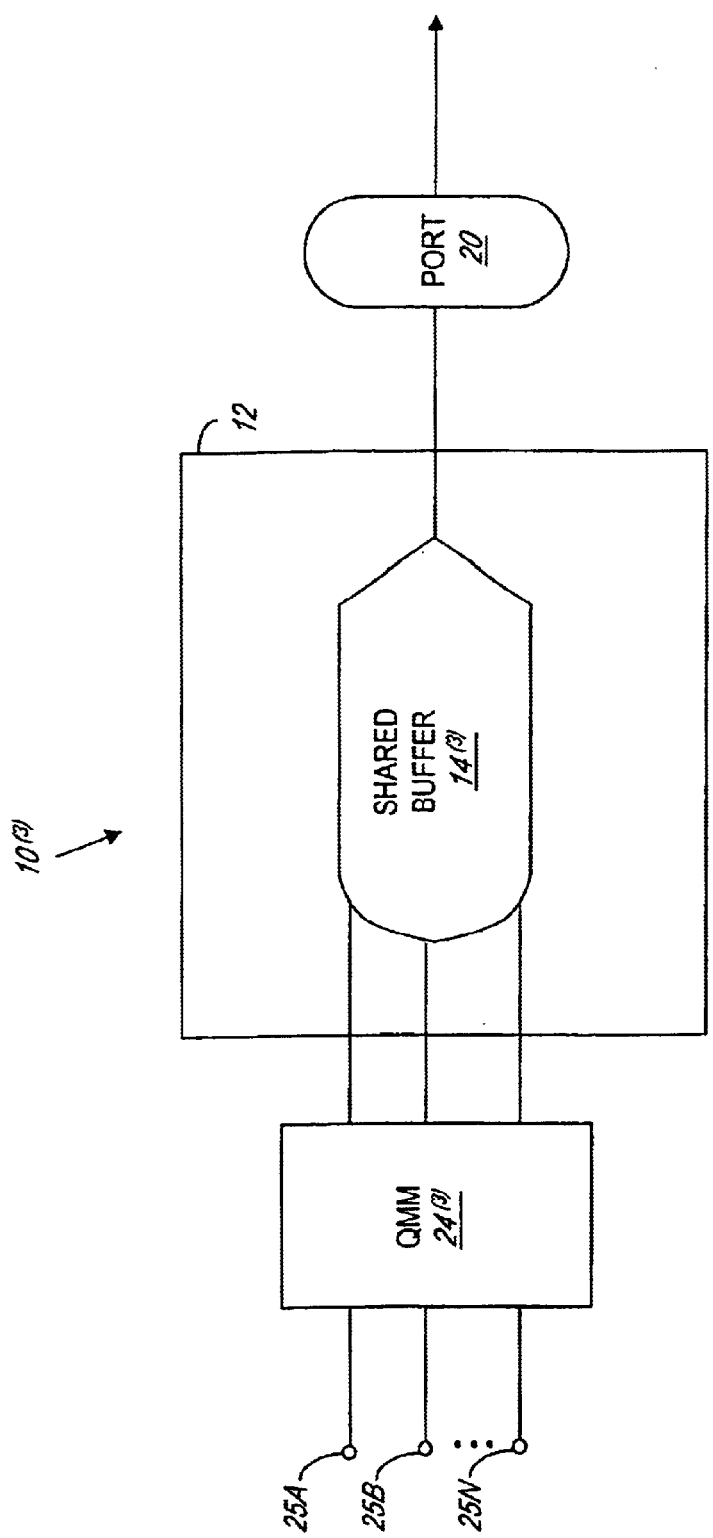
FIG. 8 is a system block diagram of a buffering system according to a third embodiment of the invention.
Figure 9:
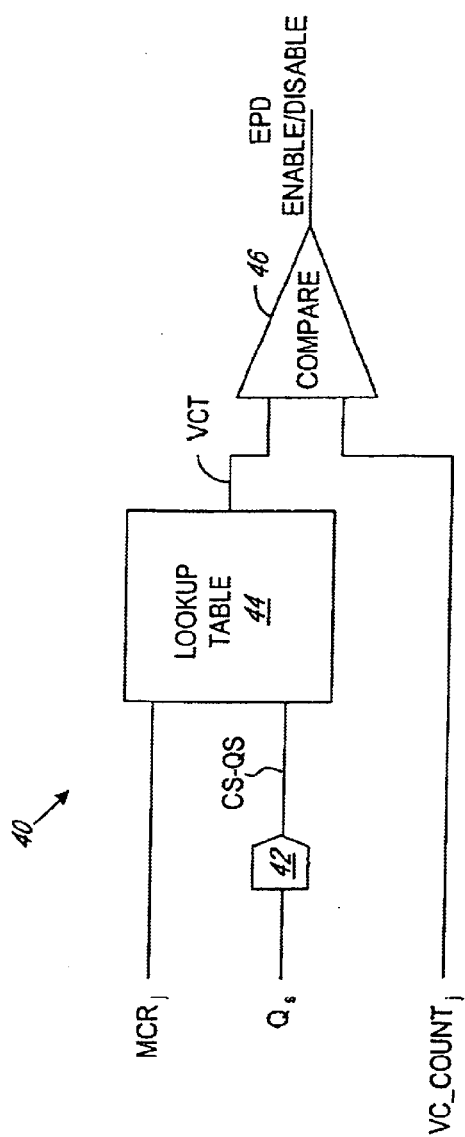
FIG. 9 is a hardware block diagram of a portion of the buffering system of the third embodiment.
Figure 10:
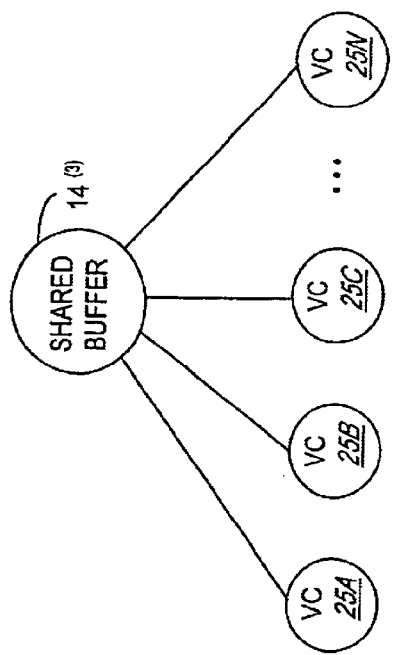
FIG. 10 is a diagram showing, in tree form, how the memory of the third embodiment is hierarchically partitioned.

For example, FIGS. 8–10 show a third embodiment, implemented in hardware, which only considers current congestion. This embodiment is directed toward a buffering subsystem $10^{(3)}$ wherein the physical memory 12 is partitioned into a shared memory buffer $14^{(3)}$ provisioned for only one of ABR and UBR traffic, or alternatively for traffic from both classes. The remaining portion of the memory 12 may be allocated to other ATM service categories, as described previously, or reserved for over-allocation purposes. FIG. 10 is a tree diagram showing the hierarchical partition of the memory for this buffering scheme. Since the subsystem $10^{(3)}$ features only one egress port and no partitionment amongst service classes, the memory partitionment and corresponding traffic flow hierarchy only has two levels, namely shared buffer $14^{(3)}$ and VCs 25.

FIG. 9 shows hardware 40 incorporated within the QMM $24^{(3)}$ of this embodiment for determining whether to enable or disable packet discard. The hardware 40 comprises three inputs, as follows:

Qs: A counter in respect of the total number of cells occupying the shared buffer $14^{(3)}$, thereby reflecting the actual occupancy size of the shared buffer. This counter is incremented/decremented by the QMM $24^{(3)}$ upon cell arrival/departure.

VC-Count j: A counter in respect of the total number of cells occupied by VC j. This counter is incremented/decremented by the QMM 16 upon the arrival/departure a cell belonging to VC j.

MCR j: The MCR value of VC j.

The QMM 16 utilizes the hardware 40 whenever an end of packet cell (of an AAL frame) arrives, in which case congestion control is executed. The Qs counter or variable is fed to a quantizing function 42 which produces a quantized congestion variable CS-Qs, having a pre-specified range of values, e.g., 0 to 2047 (i.e., an 11 bit quantity). The quantization function maps Qs to CS_Qs based on the line rate of the egress port 20. For example, for a given value of Qs, an egress port having a line rate of 1.6 Mb/s will map onto a lower quantized value CS_Qs than an egress port having a line rate of 800 kb/s. Table 1 below shows an example of this mapping for some common standardized line rates where the pre-provisioned target size for the shared buffer $24^{(3)}$ is 32k cells.

TABLE 1

| | Qs | | | |
|---|---|---|---|---|
| DS-3/E-3 | QC-3 | OC-12 | CS_Qs | |
| [12284, 32k] ooo | [28664, 32k] ooo | [24568, 32k] ooo | 2047 o o o | |
| [4100,4103] [0,4099] | [12296,12303] [0,12295] | [8200,8207] [0,8199] | 1 0 | |

It should be appreciated that CS_Qs thus corresponds to a disparity between the target and actual memory occupancy of the shared buffer $14^{(3)}$. It should also be noted that the function which measures congestion differs depending on the line rate of the egress port.

The target memory occupancy or threshold, VCT, for a connection j featuring an EOP cell is computed by multiplying the MCR of the connection by a predetermined value selected from a lookup table 44 based on the quantized shared buffer congestion variable CS_Qs. The lookup table 44 provides in effect pre-computed values of a predetermined function. Table 2 shows an example of such a pre-determined function in respect of an OC-12 egress port.

TABLE 2

| Decimal Value of CS_Qs (Input) | VCT (Output) |
|---|---|
| [0, 488] | $MCR_j$ × 120.96 |
| [489, 1697] | $MCR_j$ × 120.96 × $0.9926094^{(CS\_Qs-488)}$ |
| [1698, 2,047] | 0 |

This table provides a decaying exponential function when CS-Qs is in the range of 489–1697; a maximum value of 120.96 when CS_Qs is in the range of 0–488, wherein the shared buffer is relatively uncongested; and a minimum value of 0 when CS_Qs is in the range of 1698–2047, wherein the shared buffer is deemed to be very congested.

When the end of packet cell arrives, a comparator 46 compares the memory occupancy threshold of the VC, i.e., VCT, against VC_count[j], and if the latter is greater than the former an EPD signal 48 is enabled. Otherwise the EOP cell is stored and the EPD signal 48 is disabled.

2. Extending the Recursive FBA to Enable Random Early Discard

Figure 11:
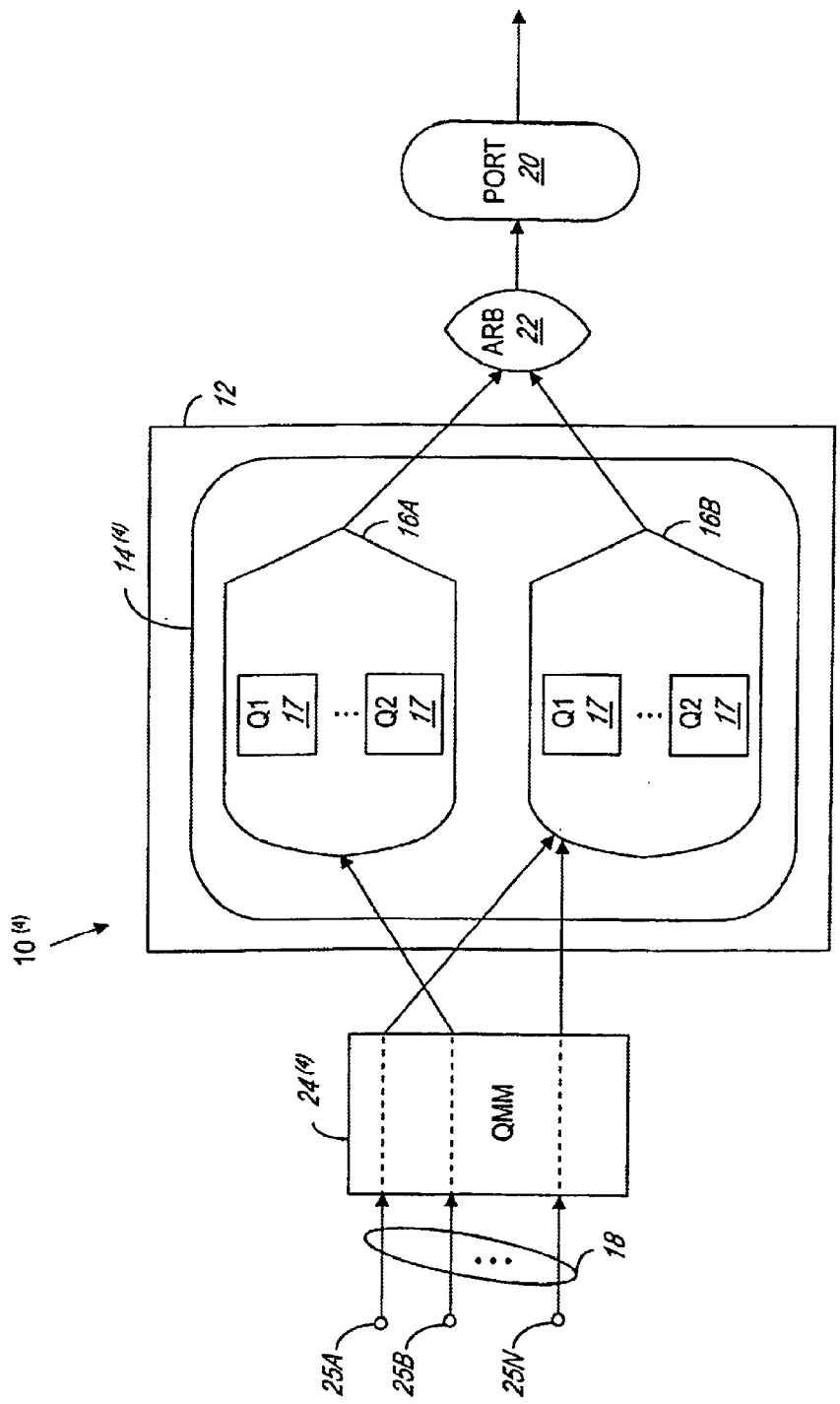
FIG. 11 is a system block diagram of a buffering system which includes random early detection, according to a fourth embodiment of the invention.
Figure 12:
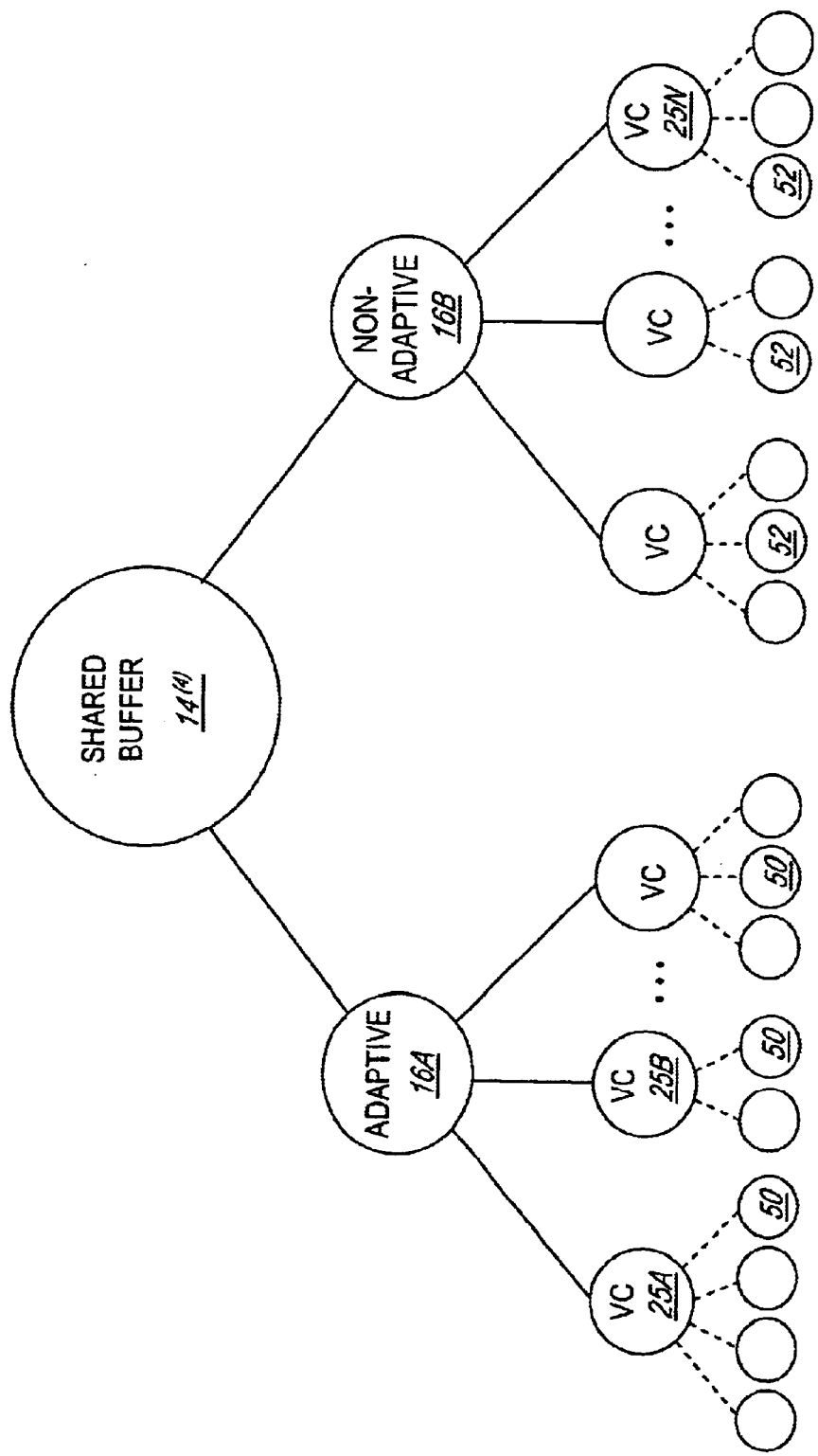
FIG. 12 is a diagram showing, in tree form, how the memory of the fourth embodiment is hierarchically partitioned.

FIGS. 11 and 12 show a fourth embodiment which relates to a single-port ATM buffering subsystem $10^{(4)}$ capable of carrying IP traffic. In this embodiment as shown in FIG. 11, the memory 12 is partitioned into a shared memory buffer $14^{(4)}$ provisioned specifically for UBR traffic. The remaining portion of the memory 12 may be allocated to other ATM service categories, as described previously, or reserved for over-allocation purposes. Within the UBR shared buffer, adaptive and non-adaptive service classes 16a and 16b are defined and separate queues 17 are provisioned to hold cells in aggregate for the VCs 25 of the corresponding service class. FIG. 12 shows the hierarchical partitionment of the memory 12. In this embodiment, VCs of the adaptive service class carry adaptive IP flows such as TCP flows 50 and VCs of the non-adaptive service class carry non-adaptive flows such as UDP flows 52. It is not, however, necessary for every VC in the UBR class to carry IP-based traffic and a third service class may be defined for such VCs which may, for instance, carry native ATM traffic. In any event, note that the VCs are the most granularly defined traffic flows for the purposes of hierarchically partitioning the memory 12, but that these VCs may carry more granular IP traffic flows.

The algorithm executed by the QMM 24$^{(4)}$ of this embodiment is substantially identical to that described above in connection with FIGS. 5 and 6 for computing the target memory occupancy sizes or thresholds for service classes and VCs. However, because some of the VCs carry IP-based traffic, the QMM 24$^{(4)}$ of this embodiment enables the random early discard of IP packets (i.e., AAL5 frames) carried by such VCs in order to improve network performance for IP-based traffic. Additional lines of pseudo-code for enabling the random early discard of packets are shown below. For simplicity, because it is typically unknown a priori which VCs carry adaptive flows and which VCs carry unadaptive flows, the additional code is executed for all VCs carrying IP-based traffic. Alternatively, the additional code may be selectively executed only in relation to those VCs carrying adaptive IP traffic if that information is available.

ADDITIONAL PSEUDO-CODE

DEFINITIONS:
Per Service Class
$Min_{th}[j]$ -- A variable representing the minimum threshold of permissible memory occupancy for connection j in the UBR (or other) service class, as required by RED.
$Max_{th}[j]$ -- A variable representing the maximum threshold of permissible memory occupancy for connection j in the UBR (or other) service class, as required by RED.
$\alpha, \beta$ - Constants used to weight the VC threshold in order to compute $Min_{th}$ and $Max_{th}$.
Per Connection
Avg[j] -- A variable representing the average memory occupancy size of connection j in the UBR service class.
RED_count[j] -- A variable representing the number of IP packets (i.e., AAL5 frames) received until one is dropped for connection j of the UBR service class. This variable is computed based on Avg[j] and a random component R[j], and is decremented until it reaches 0, at which point the incoming IP packet is discarded or dropped for RED purposes.
Temp_RED_count[j] - A temporary variable.
R[j] - A random uniform variable in the range 0 ... 1 used to compute RED_count[j].
$P_r[j]$ - A variable representing the probability of dropping a packet as a function of Avg[j].
$Max_p$ - A global constant setting an upper bound on any $P_r$.
PERIODICALLY COMPUTE RED_COUNT[i][j] (FOR IP-BASED CONNECTIONS)
(140)   $Min_{th}[j] := \alpha * VCT[UBR][j]$ (// where UBR indicates the UBR service class)
(142)   $Max_{th}[j] := \beta * VCT[UBR][j]$
(144)   //calculate Avg[j] as a function of the number of packets
(146)   if ($Min_{th}[j] <= Avg[j] <= Max_{th}[j]$)

(148)
$$P_r[i][j] := \left(\frac{Max_p}{Max_{th}[j] - Min_{th}[j]}\right) * Avg[j] - \left(\frac{Max_p * Min_{th}[j]}{Max_{th}[j] - Min_{th}[j]}\right)$$

(150)   if (RED_count[j] <= 0)
(152)       select R[j]

(154)
$$RED\_count[j] := \left\lceil \frac{R[j]}{P_r[j]} \right\rceil$$

(156)   end if (158)
$$Temp\_RED\_count[j] := \left\lceil \frac{R[j]}{P_r[j]} \right\rceil$$

(160)       RED_count[j] := min(RED_count[j], Temp_RED_count[j])
(162)   else if(Avg[j] < $Min_{th}[j]$)
(164)       RED_count[j] := -1
(166)   end if
UPON PACKET (AAL5 FRAME) ARRIVAL FOR EACH IP-BASED CONNECTION:
(168)   if(RED_count[j] >0)
(170)       RED_count[j]:= RED_count[j] - 1
(172)   end if
(174)   discard packet if RED_count[j] = 0
(176)   // note also that packets are discarded once VCT[UBR][j] is exceeded in accordance with pseudo-codes lines 132 - 138 discussed above.

Referring to the additional pseudo-code, lines 140–166 are executed as a background process in order to periodically compute RED_count[j] for IP-based VCs. The value of this variable indicates which future IP packet should be dropped or discarded early, i.e., even though VCT[UBR][j] for the corresponding connection has not yet been reached. Nevertheless, once the memory occupancy for VC[UBR][j] reaches VCT[UBR][j], packets are dropped.

Lines 140 and 142 calculate the minimum and maximum thresholds for RED purposes in respect of a given VC associated with the UBR (or other) service class. These variables can alternatively be provisioned per service class or for all connections in the system irrespective of the service class. Preferably, however, the minimum and maximum thresholds are not static as in prior art implementations of RED but are based on the dynamic value of VCT[UBR] [j].

The factor a is preferably selected such that $Min_{th}[j]$ represents a state of non-impending congestion in which case the probability of discard should be zero. For instance, if $\alpha$ is set to 0.25, no packets will be discarded if the memory occupancy is less than 25% of the target memory occupancy VCT[UBR][j]. Similarly, $\beta$ is selected such that $Max_{th}[j]$ represents a state of impending congestion in which the maximum discard probability $Max_P$ should apply. $Max_P$ and $\beta$ may each be set to one (1) if desired so that the probability of discard approaches 1 as the target occupancy threshold of the VC is reached.

Line 144 calculates the average memory occupancy size, Avg[j], for connection j of the UBR service class. A moving average computation, as known in the art per se, is preferably employed for this purpose. In the alternative, the current memory occupancy size of connection may be used to minimize computational complexity.

At line 146 Avg[j] is tested to see if it falls within the range defined by the minimum and maximum thresholds for the connection. If so, then congestion is "anticipated" and the drop probability $P_r[j]$ is computed as disclosed in the pseudo-code based on how close Avg[j] is to the maximum threshold. At line 150 Red_count[j], which represents the number of packets that may be received until one is randomly dropped, is tested to see if it is less than or equal to zero. If so, this indicates that a packet must be dropped for RED purposes. Accordingly at line 152 a new value for the random uniform variable R[j] is selected and at line 154 a new value for Red_count[j] is computed.

At line 158 a parallel value for Red_count[j] is computed based on $P_r[j]$ as computed at line 148. At line 160 the algorithm selects the minimum of the current value of Red_count[j] and the parallel value for it. These steps are present because this part of the algorithm runs as a background process and may be invoked asynchronously of lines 168–174 which are triggered upon the arrival of an IP packet. Thus, in the absence of lines 158–160, Red_count[j] may be set to a higher value before a packet has been dropped in connection with the value of Red_count[j] as computed in respect of the previous iteration of this background process. At the same time, if congestion increases, the probability of dropping a packet should increase, causing Red_count[j] to decrease in value in the present iteration of the process. If this is the case, it is preferred to immediately capture the new value of Red_count[i][j].

At lines 162–164 Red_count[j] is set to −1 in the event Avg[j] is less than the minimum threshold for that connection.

Lines 168–174 are triggered upon the arrival of an IP packet (or AAL5 frame). If RED_count[j] is greater than zero it is decremented at line 170. If at line 174 RED_count [j] is equal to zero for the corresponding VC then the packet is discarded for RED purposes. Note also that if the memory occupancy size of that VC is greater than VCT[UBR][j] then the packet will be discarded in accordance with the EPD criteria provided by lines 132–138.

Figure 13B:
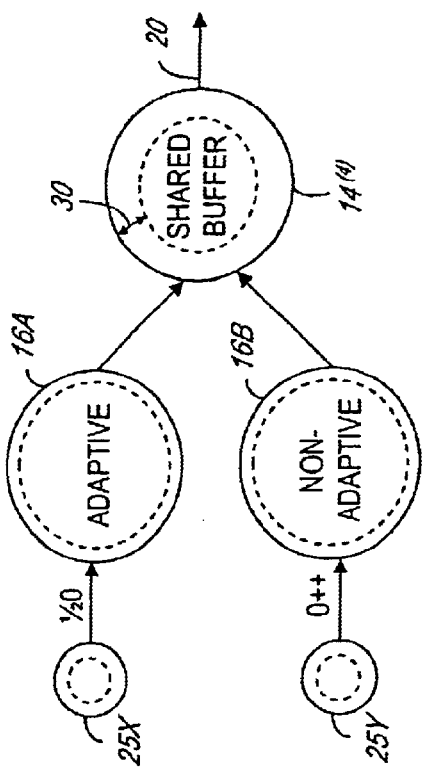
FIGS. 13A–13C are diagrams showing changes to the hierarchical partitionment of the memory in the fourth embodiment under various conditions.
Figure 13C:
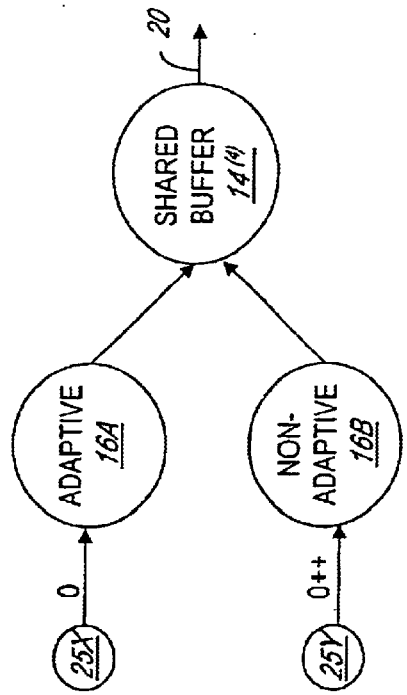
Figure 13A:
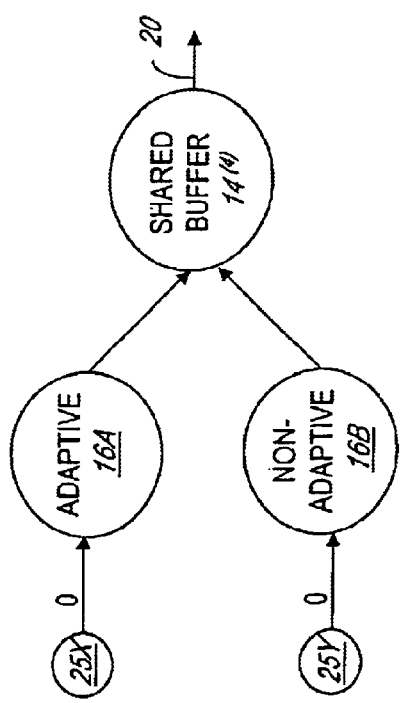

The present embodiment does not suffer from the drawbacks associated with the use of RED in networks featuring adaptive and non-adaptive flows such as the TCP-carrying VCs and UDP-carrying VCs hereof. The primary reason for this is that the recursive FBA scheme fairly apportions the buffer space between adaptive flows and non-adaptive flows at the service class level. This can be seen in the example shown in FIGS. 13A–13C where, for simplicity, only one VC 25X or 25Y is present in each service class, as shown. FIG. 13A illustrates an initial condition wherein the VCs 25x and 25y of the adaptive and non-adaptive service classes 16a and 16b are transmitting packets at equal rates $\Phi$. In this condition, the service rate is twice the VC transmission rate and the system is in equilibrium in that the memory occupancy size of each element (VC, service class and shared buffer) is equal to its target memory occupancy size. At some point $t_1$ a packet is randomly dropped from VC 25x, such that the source decreases its transmission rate by half (½$\Phi$) in accordance with the TCP/IP protocol. A short time $t_2$ later, as shown in FIG. 13B, the actual size of the shared buffer $14^{(4)}$ (represented by stippled lines) becomes smaller than its target size (represented by solid lines) such that disparity 30 exists. Under the preferred recursive FBA, this will cause the target sizes (represented by solid lines) of service classes 16a and 16b and VCs 25x and 25y to increase. If a short time $t_2$+later the non-adaptive VC 25y increases its transmission rate to $\Phi$++, the system is able to temporarily buffer the excess packets corresponding to the differential in transmission rates (i.e., $\Phi$++−TX) since the target sizes of VC 25y and services class 16y have increased and the shared buffer $14^{(4)}$ is not yet congested. The system will allow full buffer sharing as discussed above. However, as the source of the adaptive VC 25x increases its transmission rate back to $\Phi$, the shared buffer $14^{(4)}$ begins to fill up, resulting in the target sizes of service classes 16a, 16b and VCs 25x and 25y returning to their initial states, as shown in FIG. 13C. Consequently, packets will be discarded from the non-adaptive VC 25y since its transmission rate is greater than its initial rate $\Phi$. Thus, while the non-adaptive VC can take advantage of idle buffer space during the transient period required for the source of the adaptive VC 25 to return to its nominal transmission rate, under steady state conditions the non-adaptive VC 25y cannot monopolize the buffer even through random early discard has been applied.

Those skilled in the art will recognize that while portions of the above pseudo-code are similar to the RED algorithm described by Floyd and Jacobson, supra, the invention may alternatively employ other variants of RED. These include the Adaptive Random Early Detection Algorithm (ARED), proposed in Feng, W., Kandlur, D., Saha, D., and Shin, K., *Techniques for Eliminating Packet Loss in Congested TCP/IP Networks*, unpublished, and the Random Early Drop with Ins and Outs (RIO) described in Clark and Fang, *Explicit Allocation of Best Effort Packet Delivery Service*, IEEE/ACM Transactions on Networking, vol. 6, no. 4, August, 1998.

Figure 14:
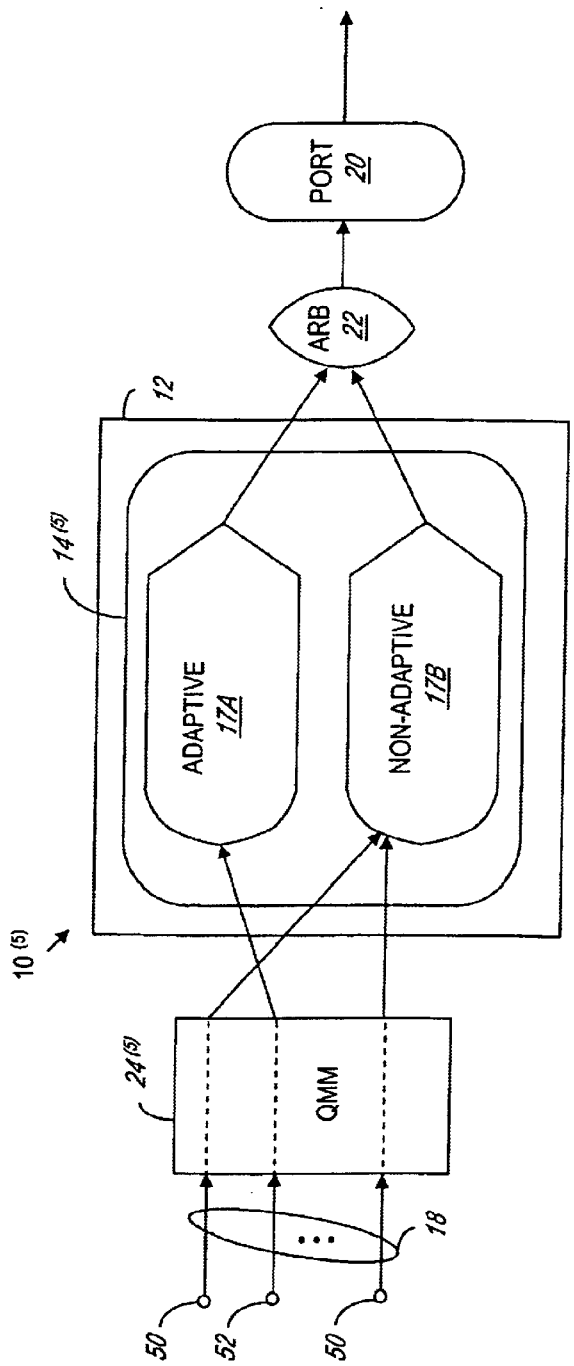
FIG. 14 is a system block diagram of a buffering system which includes random early detection, according to a fifth embodiment of the invention.
Figure 15:
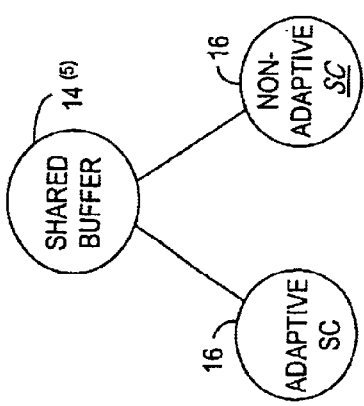
FIG. 15 is a diagram showing, in tree form, how the memory of the fifth embodiment is hierarchically partitioned.

Similarly, those skilled in the art will understand that the above algorithm may be modified so that RED or one of its variants may be applied at the service class level or any other level where adaptive and non-adaptive traffic are distinguished. This is possible whether the VC level is present in the hierarchy or not. For example, FIGS. 14 and 15 show a fifth embodiment which relates to a single port IP router buffering system $10^{(5)}$. In this embodiment, as shown in FIG. 14, the memory 12 is partitioned into a shared memory buffer $14^{(5)}$ which is further partitioned into service class queues 17a and 17b for adaptive and non-adaptive flows 50 and 52 contained within input stream 18. FIG. 15 shows the hierarchical partitionment of the memory 12. In this embodiment, there are only two such levels, namely the shared buffer and service classes, and the target memory occupancy sizes for these traffic flow sets are as follows:

TBS=constant

TSCS=g {B_count, TBS}

SCT [i]=$w_{SC}$[i]*TSCS where TBS represents the target occupancy of the shared buffer $14^{(5)}$;

B_count is a count of the memory occupancy size of the shared buffer $14^{(5)}$;

$w_{SC}$[i] is a weight provisioned per service class;

g{B_count, TBS} is an iterative function providing a predetermined progression based on a disparity between the actual memory occupancy size of the shared buffer $14^{(5)}$ and the target occupancy thereof;

TSCS represents the nominal target size for each service class 16; and

SCT[i] represents the weighted threshold for each service class.

In addition, pseudo-code lines 140–174 for providing RED-like functionality are modified for this embodiment by setting $Min_{th}$[i]:=$\alpha$.SCT [i] and $Max_{th}$[i]=$\beta$.SCT[i]. Lines 168–174 are triggered whenever an IP packet arrives.

3. Alternative FBAs

The foregoing has described the application of random early detection to the preferred recursive FBA. However, other dynamic FBA schemes may be used in the alternative, including:

Choudhury and Hahne, "Dynamic Queue Length Thresholds in a Shared Memory ATM Switch", ©1996 IEEE, Ref. No. 0743-166X/96; and Guerin et al., "Scalable QoS Provision Through Buffer Management", Proceedings of the ACM S19 COM Vancouver, September 1998, all of which is incorporated herein by reference.

In each of the foregoing schemes a target or threshold size is established for a particular type of traffic flow. For instance, the Choudhury and Hahne scheme may be used to dynamically establish a threshold memory occupancy size for VCs in an ATM switch. The network may be configured so that VCs carry either adaptive or non-adaptive IP flows, but not both. Once the different types of flows are logically isolated, the pseudo-code described in lines 140–176 may be employed to apply random early detection in accordance with the invention. In this case, the $Min_{th}$ and the $Max_{th}$ thresholds computed in lines 140 and 142 are based on the VC thresholds computed by the Choudhury et. al. reference. The drawbacks of the prior art associated with the use of RED are also avoided by this embodiment since the FBA scheme ensures that the non-adaptive VCs do not monopolize the shared buffer. However, because the Choudhury et. al. FBA scheme reserves buffer space to prevent overflows, this embodiment does not allow for full buffer sharing, in contrast to the preferred FBA scheme.

Those skilled in the art will understand that while the embodiments described herein have disclosed two, three and four level memory partition/traffic flow hierarchies, far more elaborate hierarchies may be constructed. Other possible hierarchies specific to the ATM environment include (from top level to bottom level):

buffer, port, service category, groups of virtual circuits, individual virtual circuits;

buffer, port, service category, queue, virtual circuit;

buffer, port, service category, virtual path aggregation (VPA), and virtual circuit;

buffer, port, service category, virtual private network (VPN), and virtual circuit;

buffer, port, service category, VPN, VPA, and virtual circuit;

buffer, port, service category, aggregation of VCs (alternatively referred to as a VC merge);

buffer, port, service category.

Similarly, those skilled in the art will appreciate that numerous modifications and variations may be made to the preferred embodiment without departing from the spirit of the invention.

What is claimed is:

1. A method of processing packets at a queuing point in a communications device, the method comprising:

receiving and associating packets with one of a plurality of traffic flow sets each said set comprising one of adaptive traffic flows and non-adaptive traffic flows;

dynamically computing a target memory occupancy size for each said traffic flow set in accordance with a pre-determined dynamic fair buffer allocation scheme;

discarding packets associated with any of said traffic flow sets in the event the set is in a congested state; and prior to discarding packets due to congestion, discarding packets associated with the traffic flow sets containing adaptive traffic flows according to a dynamically computed probability of packet discard, wherein the probability of packet discard of any such traffic flow set is related to the target memory occupancy size thereof.

2. The method according to claim 1, wherein packets are discarded from all said traffic flow sets.

3. The method according to claim 1, including measuring the actual memory occupancy size of each said traffic flow set, and wherein a traffic flow set is congested when the actual memory occupancy size thereof reaches or exceeds its target memory occupancy size.

4. The method according to claim 1, wherein the probability of packet discard for a given traffic flow set is zero if the target memory occupancy size thereof is below a threshold value.

5. A method of buffering packets in a communications device, the method comprising:

defining a hierarchy of traffic flow sets the hierarchy including at least a top level and a bottom level, wherein each non-bottom level traffic flow set comprises one or more child traffic flow subsets and wherein at one said non-bottom hierarchical level each said set within a group of traffic flow sets comprises one of adaptive or non-adaptive traffic flows;

provisioning a target memory occupancy size for each top-level traffic flow set;

dynamically determining a target memory occupancy size for each traffic flow set having a parent traffic flow set based on a congestion measure of the parent traffic flow set;

measuring the actual amount of memory occupied by the packets associated with each bottom level traffic flow set;

enabling the discard of packets associated with a given bottom level traffic flow set in the event the actual memory occupancy size of the corresponding bottom level traffic flow reaches or exceeds the target memory occupancy size thereof to thereby relieve congestion; and enabling packets associated with the traffic flow sets comprising the adaptive traffic flows to be randomly discarded prior to the step of discarding packets for relieving congestion.

6. The method according to claim 5, wherein packets are randomly discarded from the traffic flow sets comprising adaptive flows and traffic flow sets comprising non-adaptive flows.

7. The method according to claim 5, wherein the probability of discarding a packet associated with a given traffic flow set at said pre-selected level of said hierarchy is based on (i) the target memory occupancy size of said given traffic flow set, or, (ii) the target size of a descendant traffic flow set thereof which is also associated with said packet.

8. The method according to claim 7, wherein the probability of discard is zero if the actual memory occupancy size of the corresponding traffic flow set is less than a predetermined to of its target memory occupancy size.

9. The method according to claim 7, wherein each non-top level traffic flow set is a subset of a traffic flow set located on an immediately higher level of the hierarchy and each non-bottom level traffic flow set is a superset of at least one traffic flow set located on an immediately lower level of the hierarchy.

10. The method according to claim 9, including measuring the actual amount of memory occupied by each traffic flow set of the hierarchy.

11. The method according to claim 9, wherein said step of determining a target size includes computing a nominal target occupancy size for all the child traffic flow sets of a common parent and provisioning each such child traffic flow set with a weight, wherein the target memory occupancy size of each such child traffic flow set is a weighted amount of the nominal target occupancy size.

12. The method according to claim 11, wherein the nominal target occupancy size for a group of child traffic flow sets having a common parent changes in accordance with a prespecified function in response to the congestion of the common parent traffic flow set.

13. The method according to claim 12, wherein congestion is correlated to a disparity between the target and measured memory occupancy sizes of a traffic flow set.

14. The method according to claim 9, wherein the target memory occupancy size for each non-top level traffic flow set changes in accordance with a prespecified function in response to a disparity between the target and measured memory occupancy sizes of its parent traffic flow set.

15. The method according to claim 9, wherein a bottom level traffic flow set comprises an individual traffic flow selected from the group consisting of: a virtual connection; a label switched path; and a logical stream of packets resulting from the forwarding rules of a packet classifier.

16. The method according to claim 5, wherein said packet is one of: an IP packet, an AAL frame, and an ATM cell.

17. The method according to claim 4, wherein said packet is one of: an IP packet, an AAL frame, and an ATM cell.

18. The method according to claim 17, wherein congestion is correlated to a disparity between the target memory occupancy size and a measured memory occupancy size of a traffic flow set.

* * * * *